(12) United States Patent
Zhu et al.

(10) Patent No.: US 10,827,557 B2
(45) Date of Patent: Nov. 3, 2020

(54) NETWORK ACCESS CONTROL METHOD AND APPARATUS

(71) Applicant: HUAWEI TECHNOLOGIES CO., LTD., Guangdong (CN)

(72) Inventors: Hualin Zhu, Shanghai (CN); Huan Li, Shanghai (CN); Weisheng Jin, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 58 days.

(21) Appl. No.: 16/260,601

(22) Filed: Jan. 29, 2019

(65) Prior Publication Data

US 2019/0159282 A1 May 23, 2019

Related U.S. Application Data

(63) Continuation of application No. PCT/CN2016/092523, filed on Jul. 30, 2016.

(51) Int. Cl.
| | |
|---|---|
| *H04W 76/36* | (2018.01) |
| *H04W 36/00* | (2009.01) |
| *H04W 76/18* | (2018.01) |
| *H04W 48/02* | (2009.01) |
| *H04W 76/15* | (2018.01) |

(Continued)

(52) U.S. Cl.
CPC ....... *H04W 76/36* (2018.02); *H04W 36/0069* (2018.08); *H04W 48/02* (2013.01); *H04W 76/15* (2018.02); *H04W 76/16* (2018.02); *H04W 76/18* (2018.02); *H04W 52/0238* (2013.01)

(58) Field of Classification Search
CPC . H04W 76/36; H04W 76/16; H04W 36/0069; H04W 76/18; H04W 48/02; H04W 76/15; H04W 52/0238; H04W 36/0079; H04W 60/00; H04W 8/26; H04W 76/27
See application file for complete search history.

(56) References Cited

U.S. PATENT DOCUMENTS

| | | | |
|---|---|---|---|
| 2012/0172063 A1* | 7/2012 | Lee | H04W 74/006 |
| | | | 455/458 |
| 2015/0045052 A1 | 2/2015 | Pao et al. | |
| 2015/0133122 A1 | 5/2015 | Chen | |

(Continued)

FOREIGN PATENT DOCUMENTS

| | | |
|---|---|---|
| CN | 101959281 A | 1/2011 |
| CN | 104349419 A | 2/2015 |

(Continued)

*Primary Examiner* — Afshawn M Towfighi
(74) *Attorney, Agent, or Firm* — Womble Bond Dickinson (US) LLP

(57) ABSTRACT

A network access control method and an apparatus are disclosed. The method includes controlling, by a first network device if determining that a terminal device already establishes a second data connection to a second network, the terminal device to stop establishment of a first data connection to a first network, or controlling the terminal device to end the second data connection, to smoothly establish a first data connection. In this way, it can be ensured that a data connection exists between the terminal device and one network, and it can be ensured that the terminal device can normally transmit data.

16 Claims, 24 Drawing Sheets

(51) Int. Cl.
*H04W 76/16* (2018.01)
*H04W 52/02* (2009.01)

(56) References Cited

U.S. PATENT DOCUMENTS

| | | | | |
|---|---|---|---|---|
| 2015/0264609 A1* | 9/2015 | Zhang | ............... | H04W 36/0055 |
| | | | | 455/436 |
| 2015/0282239 A1* | 10/2015 | Han | ...................... | H04W 76/27 |
| | | | | 370/329 |
| 2016/0066237 A1* | 3/2016 | Kato | ..................... | H04W 24/10 |
| | | | | 370/331 |
| 2016/0183322 A1 | 6/2016 | Huang | | |
| 2018/0014353 A1 | 1/2018 | Pao et al. | | |

FOREIGN PATENT DOCUMENTS

| | | | |
|---|---|---|---|
| CN | 104349505 | A | 2/2015 |
| CN | 105309008 | A | 2/2016 |
| CN | 105577698 | A | 5/2016 |
| CN | 105744591 | A | 7/2016 |
| EP | 2770796 | A2 | 8/2014 |
| WO | 0150804 | A1 | 7/2001 |
| WO | 2014/056130 | A1 | 4/2014 |

\* cited by examiner

NETWORK ACCESS CONTROL METHOD AND APPARATUS

CROSS-REFERENCE TO RELATED APPLICATIONS

This application is a continuation of International Patent Application No. PCT/CN2016/092523, filed on Jul. 30, 2016. The disclosure of the aforementioned application is hereby incorporated by reference in its entirety.

TECHNICAL FIELD

This application relates to the field of communications technologies, and in particular, to a network access control method and an apparatus.

BACKGROUND

At present, with development of communications technologies, many terminal devices support access to a plurality of networks of different types. In some cases, even if a terminal device accesses a plurality of networks, the terminal device cannot transmit data in parallel by using two or more networks. To be specific, when the terminal device transmits data by using one network (where the terminal device establishes a data connection to the network), a data connection between the terminal device and another network needs to be ended. For example, the terminal device is in an idle state in the another network.

If a terminal device can access a plurality of networks but cannot transmit data in parallel by using the plurality of networks, when the terminal device establishes a data connection to one network, and forcibly establishes a data connection to another network, some network connection errors or runtime errors of the terminal device occur. Consequently, data cannot be normally transmitted.

For example, a terminal device in dual connectivity (DC) mode can access both a second access Long Term Evolution (SALTE) network and a Long Term Evolution (LTE) network. The terminal device can access the SALTE network only when the terminal device does not access the LTE network or the terminal device is in an idle state in the LTE network. If the terminal device forcibly accesses the SALTE network when the terminal device is in a connected state in the LTE network, a network connection error or a runtime error of the terminal device occurs.

SUMMARY

Embodiments of this application provide a network access control method and an apparatus, to resolve a prior-art problem that when a terminal device establishes a data connection to one network and forcibly establishes a data connection to another network, occurrence of some network connection errors or a runtime error of the terminal device is caused, and consequently, data cannot be normally transmitted.

Embodiments of this application are as follows:

According to a first aspect, an embodiment of this application provides a network access control method, including:

determining, by a first network device after a terminal device requests to establish a first data connection to a first network, that a second data connection exists between the terminal device and a second network; and performing any one of the following operations after the determining is completed:

a first operation: instructing, by the first network device, the terminal device to stop the establishment of the first data connection;

a second operation: instructing, by the first network device, the terminal device to end the second data connection, or after the first network device ends the second data connection, continuing, by the first network device, to perform a procedure of establishing the first data connection; or a third operation: instructing, by the first network device, a second network device to end the second data connection, and instructing a third network device to establish the first data connection.

According to the foregoing method, if the terminal device already establishes the second data connection to the second network, the first network device controls the terminal device to stop the establishment of the first data connection to the first network, or controls the terminal device to end the second data connection to the second network, to smoothly establish the first data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In one embodiment, before the determining, by a first network device, that a second data connection exists between the terminal device and the second network, the first network device receives a data connection request for the first network sent by the terminal device; or the first network device receives a status query request sent by a fourth network device. The status query request is used to instruct the first network device to determine a status of the second data connection of the terminal device.

In one embodiment, the first network device determines, in the following two manners, that the second data connection exists between the terminal device and the second network, where the two manners include:

a first manner: when the first network device is notified after the status of the second data connection of the terminal device is updated, detecting, by the first network device, that the second data connection exists between the terminal device and the second network; and a second manner: when the first network device cannot directly determine the status of the second data connection, receiving, by the first network device, a status message sent by a fifth network device, and determining, based on the status message, that the second data connection exists between the terminal device and the second network, where the status message is used to indicate that the second data connection exists between the terminal device and the second network.

According to the foregoing method, the first network device can determine that the second data connection exists between the terminal device and the second network.

In one embodiment, the first network device may determine that the terminal device is in a connected state in the second network, to determine that the second data connection exists between the terminal device and the second network. For example, when the second network is an LTE network, the first network device may determine, according to the method, that the second data connection exists between the terminal device and the second network.

According to the foregoing method, the first network determines that the terminal device is in the connected state in the second network, to determine that the second data connection exists.

In one embodiment, the instructing, by the first network device, the terminal device to stop the establishment of the first data connection includes:

sending, by the first network device, an access stop message to the terminal device, where the access stop message is used to instruct the terminal device to stop the establishment of the first data connection.

According to the foregoing method, if the terminal device already establishes the second data connection to the second network, the first network device controls the terminal device to stop the establishment of the first data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In one embodiment, the access stop message includes a status error cause, and the status error cause is used to notify that the second data connection exists between the terminal device and the second network.

According to the foregoing method, the first network device can notify the terminal device of a reason for stopping the establishment of the first data connection.

In one embodiment, the first network device forwards the access stop message to the terminal device by using another network device. The another network device may be a device such as an HSS or a control plane network element.

According to the foregoing method, the first network device can smoothly send the access stop message to the terminal device.

In one embodiment, the instructing, by the first network device, the terminal device to end the second data connection includes:

sending, by the first network device, a first switching request message to the terminal device, where the first switching request message is used to instruct the terminal device to switch a data connection of the terminal device from the second data connection to the first data connection.

According to the foregoing method, if the terminal device already establishes the second data connection to the second network, the first network device controls the terminal device to switch the second data connection to the first data connection, to smoothly establish the first data connection, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In one embodiment, the first switching request message includes a status error cause, and the status error cause is used to notify that the second data connection exists between the terminal device and the second network.

According to the foregoing method, the first network device can notify the terminal device of a reason for switching the second data connection.

In one embodiment, the first network device forwards the first switching request message to the terminal device by using another network device. The another network device may be a device such as an HSS or a control plane network element.

According to the foregoing method, the first network device can smoothly send the first switching request message to the terminal device.

In one embodiment, the first network device ends the second data connection in the following two manners:

a first manner: the first network device initiates a release procedure of the second data connection, for example, the first network device initiates an S1-release procedure; and a second manner: the first network device switches a data connection of the terminal device from the second data connection to the first data connection.

According to the foregoing method, if the terminal device already establishes the second data connection to the second network, the first network device directly ends the second data connection, to smoothly establish the first data connection, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In one embodiment, the instructing, by the first network device, the second network device to end the second data connection includes:

sending, by the first network device, a second switching request message to the second network device, where the second switching request message is used to instruct the second network device to switch a data connection of the terminal device from the second data connection to the first data connection.

According to the foregoing method, if the terminal device already establishes the second data connection to the second network, the first network device controls the second network device to end the second data connection, to smoothly establish the first data connection, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In one embodiment, the second switching request message includes a status error cause, and the status error cause is used to notify the second network device that the second data connection exists between the terminal device and the second network.

According to the foregoing method, the first network device can notify the second network device of a reason for switching the data connection of the terminal device.

In one embodiment, the first network device determines that no data connection exists between the terminal device and the second network; and the first network device performs a procedure of establishing the first data connection.

In one embodiment, the first network device determines that the terminal device is in an idle state in the second network, to determine that no data connection exists between the terminal device and the second network. For example, if the second network is an LTE network, according to the foregoing method, it can be determined that no data connection exists between the terminal device and the second network.

According to the foregoing method, the first network device determines that the terminal device is in the idle state in the second network, and determines that no data connection exists between the terminal device and the second network.

In one embodiment, the first network device includes a control plane network element or a home subscriber server HSS.

According to a second aspect, an embodiment of this application provides a network access control method, including:

after a terminal device requests to establish a first data connection to a first network, when the terminal device receives an access stop message sent by a first network device, stopping, by the terminal device, a procedure of establishing the first data connection, where the access stop message is used to instruct the terminal device to stop the establishment of the first data connection.

According to the foregoing method, after the terminal device requests to establish the first data connection to the first network, the terminal device receives the access stop message sent by the first network device, and stops the procedure of establishing the first data connection, to avoid occurrence of a network connection error or a runtime error of the terminal device when a data connection is forcibly established to the first network.

In one embodiment, the access stop message includes a status error cause, and the status error cause is used to notify that the second data connection exists between the terminal device and the second network.

In one embodiment, the terminal device receives, by using another network device, the access stop message sent by the first network device. The another network device may be a device such as an HSS or a control plane network element.

According to the foregoing method, the terminal device can smoothly receive the access stop message sent by the first network device.

In one embodiment, the terminal device requests, in the following two manners, to establish the first data connection to the first network:

a first manner: the terminal device sends a data connection request for the first network to the first network device; and a second manner: the terminal device sends a data connection request for the first network to the another network device.

According to a third aspect, an embodiment of this application provides a network access control method, including:

after a terminal device requests to establish a first data connection to a first network, when the terminal device receives a first switching request message sent by a first network device, switching, by the terminal device, a data connection of the terminal device from a second data connection to the first data connection, where the second data connection is a data connection existing between the terminal device and a second network, and the first switching request message is used to instruct the terminal device to switch the data connection of the terminal device from the second data connection to the first data connection.

According to the foregoing method, after the terminal device requests to establish the first data connection to the first network, the terminal device receives a first switching access message sent by the first network device, and switches the data connection of the terminal device from the second data connection to the first data connection, to avoid occurrence of a network connection error or a runtime error of the terminal device when a data connection is forcibly established to the first network if the second data connection is not broken.

In one embodiment, the first switching request message includes a status error cause, and the status error cause is used to notify that the second data connection exists between the terminal device and the second network.

In one embodiment, the terminal device receives, by using another network device, the first switching request message sent by the first network device. The another network device may be a device such as an HSS or a control plane network element.

According to the foregoing method, the terminal device can smoothly receive the first switching request message sent by the first network device.

In one embodiment, the terminal device requests, in the following two manners, to establish the first data connection to the first network:

a first manner: the terminal device sends a data connection request for the first network to the first network device; and a second manner: the terminal device sends a data connection request for the first network to the another network device.

According to a fourth aspect, an embodiment of the present invention further provides a first network device. The first network device has a function of implementing an operation of the first network device in the foregoing method example. The function may be implemented by hardware or may be implemented by executing corresponding software by hardware. The hardware or the software includes one or more modules corresponding to the foregoing function.

In one embodiment, a structure of the first network device includes a receiving unit, a determining unit, and a processing unit. These units can implement corresponding functions in the foregoing method example. For details, refer to detailed descriptions in the method example, and details are not described herein again.

In one embodiment, a structure of the first network device includes a transceiver, a processor, a bus, and a memory. The transceiver is configured to communicate and interact with another device in a combined network. The processor is configured to support the first network device in performing a corresponding function in the foregoing method. The memory is coupled to the processor, and stores a necessary instruction and necessary data for the first network device.

According to a fifth aspect, an embodiment of the present invention further provides a terminal device. The terminal device has a function of implementing an operation of the terminal device according to the second aspect in the foregoing method example. The function may be implemented by hardware or may be implemented by executing corresponding software by hardware. The hardware or the software includes one or more modules corresponding to the foregoing function.

In one embodiment, a structure of the terminal device includes a sending unit, a receiving unit, and a processing unit. These units can implement corresponding functions in the foregoing method example. For details, refer to detailed descriptions in the method example, and details are not described herein again.

In one embodiment, a structure of the terminal device includes a transceiver, a processor, a bus, and a memory. The transceiver is configured to communicate and interact with another device in a combined network. The processor is configured to support the terminal device in performing a corresponding function in the foregoing method. The memory is coupled to the processor, and stores a necessary instruction and necessary data for the terminal device.

According to a sixth aspect, an embodiment of the present invention further provides a terminal device. The terminal device has a function of implementing an operation of the terminal device according to the third aspect in the foregoing method example. The function may be implemented by hardware or may be implemented by executing corresponding software by hardware. The hardware or the software includes one or more modules corresponding to the foregoing function.

In one embodiment, a structure of the terminal device includes a sending unit, a receiving unit, and a processing unit. These units can implement corresponding functions in the foregoing method example. For details, refer to detailed descriptions in the method example, and details are not described herein again.

In one embodiment, a structure of the terminal device includes a transceiver, a processor, a bus, and a memory. The transceiver is configured to communicate and interact with another device in a combined network. The processor is configured to support the terminal device in performing a corresponding function in the foregoing method. The memory is coupled to the processor, and stores a necessary instruction and necessary data for the terminal device.

According to the network access control method provided in the embodiments of this application, if the terminal device already establishes the data connection to the second network, the first network device controls the terminal device to stop the establishment of the data connection to the first network, or controls the terminal device to break the data connection to the second network, to smoothly establish the data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

DESCRIPTION OF EMBODIMENTS

Figure 1:
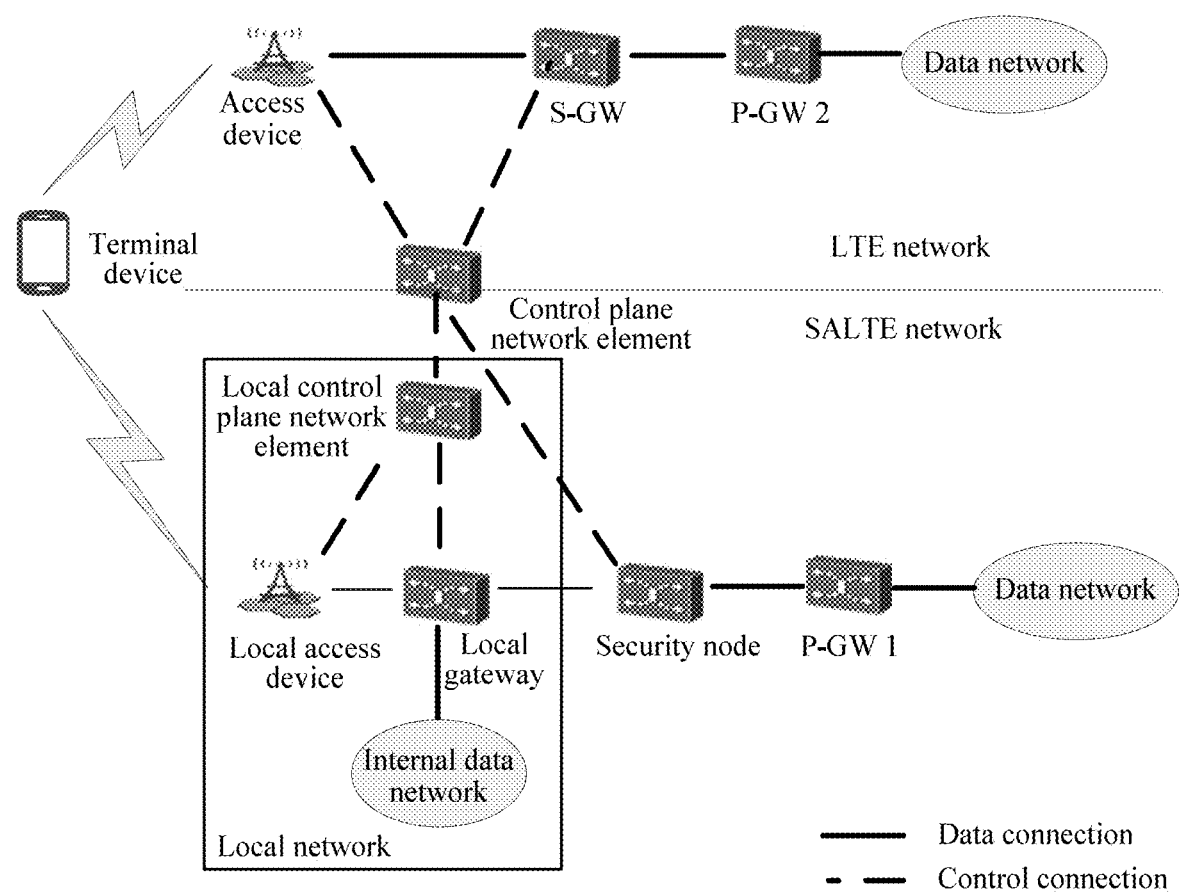
FIG. 1 is a first schematic architectural diagram of a combined network according to an embodiment of this application.

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

Embodiments of this application provide a network access control method and an apparatus, to resolve a prior-art problem that when a terminal device establishes a data connection to one network and forcibly establishes a data connection to another network, occurrence of some network connection errors or a runtime error of the terminal device is caused, and consequently, data cannot be normally transmitted. The method and the apparatus in this application are based on a same invention idea. The method and the apparatus have similar principles for resolving the problem. Therefore, for implementation of the apparatus and the method, refer to each other, and repeated parts are not described in detail again.

In the embodiments of this application, after a terminal device requests to establish a first data connection to a first network, a first network device determines that a second data connection exists between the terminal device and a second network. In this case, the first network device may instruct the terminal device to stop the establishment of the first data connection, or instruct the terminal device to end the second data connection and continue to perform a procedure of establishing the first data connection, or the first network device directly ends the second data connection and continues to perform a procedure of establishing the first data connection, or the first network device instructs a second network device to end the second data connection and instructs a third network device to establish the first data connection. In conclusion, if the terminal device already establishes the data connection to the second network, the first network device controls the terminal device to stop the establishment of the data connection to the first network, or control the terminal device to break the data connection to the second network, to smoothly establish the data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In the following, some terms in this application are explained and described, to help persons skilled in the art have a better understanding.

(1) A network in the embodiments of this application includes an access device, a user plane (UP) network element, a control plane (CP) network element, and a data network (DN). For example, the network may be an LTE network, an SALTE network, a home base station network, another non-3rd Generation Partnership Project (3GPP) mobile network (such as a mobile network accessed through Wireless Fidelity (Wi-Fi)), a Global System for Mobile Communications (GSM) network, a Wideband Code Division Multiple Access (WCDMA) network, or a future network. This is not limited in this application.

The control plane network element is a network element responsible for mobility management or forwarding path management in a mobile network, for example, control devices such as a mobility management entity (MME), a serving gateway (S-GW), and a packet data network gateway (P-GW), or another control device formed through integration of a plurality of control devices.

A user plane network element is mainly responsible for forwarding a service packet of a terminal device, for example, a physical forwarding plane device such as an S-GW, a P-GW, a router, or a switch, or another virtual forwarding plane network element.

An access device includes, but is not limited to, an evolved NodeB (eNB), a radio network controller (RNC), a NodeB (NB), a base station controller (BSC), a base transceiver station (BTS), a home base station (such as a Home evolved NodeB or a Home Node B, HNB), a baseband unit (BBU), an access point (AP), and the like.

After a terminal device accesses the network by using the access device, the terminal device establishes a data connection to the user plane network element in the network, to transmit user data between the terminal device and the data network; and the terminal device establishes a control connection to the control plane network element in the network, to implement functions such as access management, mobility management, and/or forwarding path management on the terminal device by the control plane network.

(2) An SALTE network in this application is a mobile network deployed by an operator or an enterprise. In the SALTE network, a terminal device may access an internal data network of the operator or the enterprise, or may access an external data network (to be specific, access a packet data network (PDN) connection).

(3) A terminal device in this application, also referred to as user equipment (UE), is a data connectivity device, for example, a handheld device having a wireless connection function, an in-vehicle device, a wearable device, a computing device, a mobile station (MS), another processing device connected to a wireless modem, or a mobile terminal communicating with one or more core networks by using a radio access network.

(4) A data connection in this application is a connection by using which user data can be directly transmitted. When the terminal device is in a connected state in a network, a data connection exists between the terminal device and the network.

(5) A network device in this application may be a control plane network element or a user plane network element or another device in a network, for example, a home subscriber server (HSS). A "first network device" in this application is a network device in a network that can implement network access control on a terminal device. In addition, each of a "second network device", a "third network device", and "another network device" in this application is a network device other than the first network device in the network. In a same embodiment, any two of the "second network device", the "third network device", and the "another network device" may be a same network device or different network devices. This is not limited in this application.

(6) "A plurality of" mentioned in the embodiments of this application means two or more.

The term "and/or" mentioned in the descriptions of this application describes an association relationship between associated objects and represents that three relationships may exist. For example, A and/or B may represent the following three cases: Only A exists, both A and B exist, and only B exists. The character "/" generally indicates an "or" relationship between the associated objects.

In addition, it should be understood that, in the descriptions of this application, the terms such as "first" and "second" are only used for the purpose of distinguishing and description, but cannot be understood as an indication or implication of relative importance, and cannot be understood as an indication or implication of a sequence.

The network access control method provided in the embodiments of this application is applicable to a combined network including a plurality of networks, and in the combined network, a terminal device can access the plurality of networks, but the terminal device cannot simultaneously transmit data by using the plurality of networks. The plurality of networks may include any two or more of an LTE network, an SALTE network, a home base station network, a mobile network accessed through Wi-Fi, a GSM network, or a WCDMA network. This is not limited in this application.

In the embodiments of this application, an example in which the combined network includes only an LTE network and an SALTE network is used for description, but the network access control method provided in the embodiments of this application is not limited to being implemented only in the combined network.

To more clearly describe a technical method in the embodiments of this application, possible architectures of a combined network in the embodiments of this application are described below with reference to FIG. 1 to FIG. 3.

FIG. 1 shows a possible architecture of a combined network according to an embodiment of this application. The combined network, as shown in the figure, includes two networks. A part above a thinner solid line indicates an LTE network, and a part below the solid line indicates an SALTE network.

The LTE network includes an access device, an S-GW, a P-GW 2, and a data network.

The access device is configured to connect the terminal device to the LTE network.

The S-GW is configured to: route and forward a data network in the LTE network, and provide a function related to lawful interception.

The P-GW 2 is a gateway of the data network, and is an anchor for user data transmission.

The SALTE network includes a local control plane network element, a local access device, a local gateway, and an internal data network of a local network (namely, On-site Network), and a security node, a P-GW 1, and a data network outside the local network. Each network device in the local network may be a network element device locally deployed by an operator or an enterprise or another third-party authority.

The local access device is configured to connect the terminal device to the LTE network.

The local control plane network element is mainly responsible for operations such as access management, session management, and mobility management on the terminal device in the local network.

The local gateway is configured to transmit user data.

The security node is configured to establish a secure connection to the terminal device, to ensure that user data is transparent to the local network.

The P-GW 1 and the P-GW 2 are gateways of the data network in the SALTE network, and are anchors for user data transmission.

In the combined network, the LTE network and the SALTE network share a control plane network. Therefore, the control plane network element belongs to not only the LTE network but also the SALTE network. The control plane network element is mainly responsible for operations such as authentication and service authorization on the terminal device in the combined network. For example, the control plane network element may be an MME, or may be a mobile network control plane network element such as an Authentication, Authorization and Accounting (AAA) server.

In the combined network shown in FIG. 1, a procedure after the terminal device requests the control plane network element to establish a first data connection to a first network (the LTE network or the SALTE network) (namely, a network access control procedure) includes the following:

The control plane network element determines whether a second data connection exists between the terminal device and a second network (a network in the combined network other than the first network).

When the control plane network element determines that the second data connection does not exist, the control plane network element directly performs a procedure of establishing the first data connection.

When the control plane network element determines that the second data connection exists, the control plane network element controls the terminal device to stop the establishment of the first data connection, or controls the terminal device to break the data connection to the second network, and continues to perform a procedure of establishing the first data connection.

According to the foregoing procedure, the control plane network element ensures that the terminal device can have a data connection to only one network, ensures that the terminal device can normally transmit data, implements network access control on the terminal device, and avoids occurrence of a network connection error or a runtime error of the terminal device when the terminal device has a data connection to one network and forcibly establishes a data connection to another network.

Figure 2:
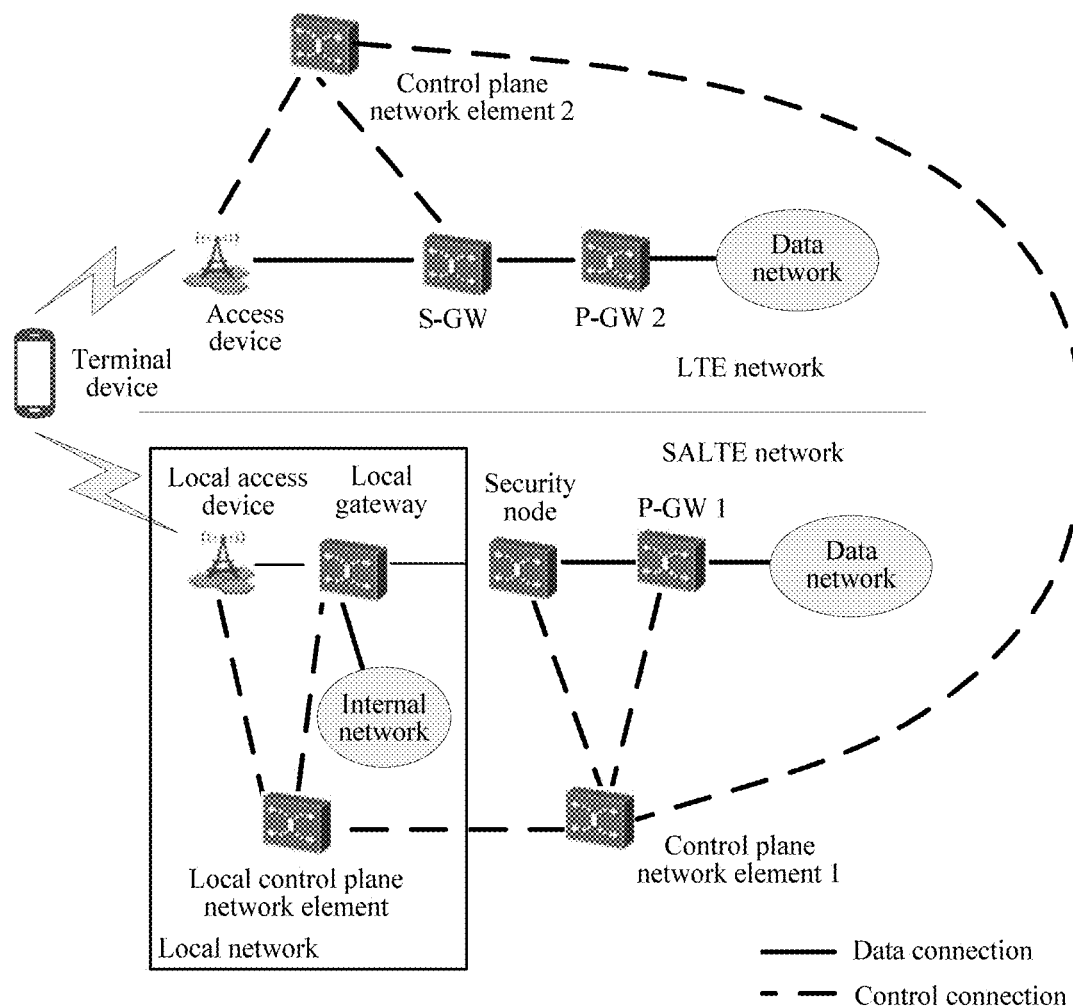
FIG. 2 is a second schematic architectural diagram of a combined network according to an embodiment of this application.

FIG. 2 shows another possible architecture of a combined network according to an embodiment of this application. Similar to the combined network shown in FIG. 1, the combined network also includes two networks. A part above a thinner solid line indicates an LTE network, a part below the solid line indicates an SALTE network, network element devices included in each of the networks are basically the same as network element devices included in a corresponding network in the combined network shown in FIG. 1, and certainly, functions of the network element devices are also the same. Details are not described herein again.

The only difference from the combined network shown in FIG. 1 lies in that, the LTE network and the SALTE network no longer share a same control plane network element, and one control plane network element is deployed in each of the SALTE network and the LTE network, namely, a control plane network element 1 and a control plane network element 2 in FIG. 2. The two control plane network elements are responsible for operations such as authentication and service authorization on the terminal device in corresponding networks. Similar to the control plane network element in FIG. 1, the control plane network element 1 and the control plane network element 2 in this embodiment of this application may each be a device such as an MME or an AAA server. This is not limited in this application.

The control plane network element 1 and the control plane network element 2 are connected by using a control plane interface, to perform mutual communication.

In the combined network shown in FIG. 2, a procedure after the terminal device requests the control plane network element 1 in a first network (the LTE network or the SALTE network) to establish a first data connection to the first network (namely, a network access control procedure) includes the following:

The control plane network element 1 sends a status query request to the control plane network element 2 in a second network (a network in the combined network other than the first network).

The control plane network element 2 determines whether a second data connection exists between the terminal device and the second network.

When determining that the second data connection does not exist, the control plane network element 2 returns a first status message to the control plane network element 1, and the control plane network element 1 directly performs a procedure of establishing the first data connection. The first status message is used to indicate that the second data connection does not exist between the terminal device and the second network.

When determining that the second data connection exists, the control plane network element 2 controls the terminal device to break a data connection to the second network, and instructs the control plane network element 1 or the terminal device to continue to perform a procedure of establishing the first data connection; or the control plane network element 2 returns a second status message to the control plane network element 1, so that the control plane network element 1 controls, based on the second status message, the terminal device to stop the establishment of the first data connection or controls the terminal device to end the second data connection, and continues to perform a procedure of establishing the first data connection. The second status message is used to indicate that the second data connection exists between the terminal device and the second network.

According to the foregoing procedure, the control plane network element 1 and/or the control plane network element 2 can ensure that the terminal device can have a data connection to only one network, ensure that the terminal device can normally transmit data, implement network access control on the terminal device, and avoid occurrence of a network connection error or a runtime error of the terminal device when the terminal device has a data connection to one network and forcibly establishes a data connection to another network.

Figure 3:
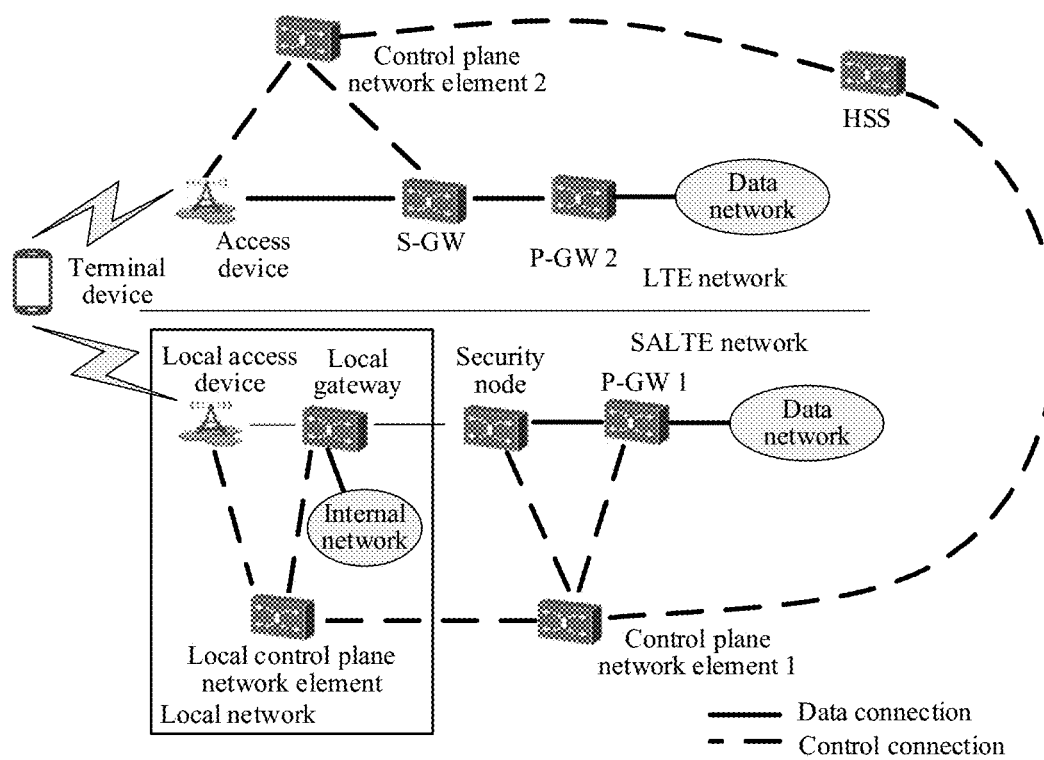
FIG. 3 is a third schematic architectural diagram of a combined network according to an embodiment of this application.

FIG. 3 shows still another possible architecture of a combined network according to an embodiment of this application. Similar to the combined network shown in FIG. 2, the combined network also includes two networks. A part above a thinner solid line indicates an LTE network, a part below the solid line indicates an SALTE network, network element devices included in each of the networks are basically the same as network element devices included in a corresponding network in the combined network shown in FIG. 2, and certainly, functions of the network element devices are also the same. Details are not described herein again.

The only difference from the combined network shown in FIG. 2 lies in that, the control plane network element 1 and the control plane network element 2 are not connected by using a control plane interface, but are connected to a same HSS, and communication between the control plane network element 1 and the control plane network element 2 is implemented by using the HSS.

In an actual scenario, the architecture of the combined network including the LTE network and the SALTE network is not limited to the three architectures shown in FIG. 1 to FIG. 3. Because there may be a relatively large quantity of possible architectures, only the foregoing three architectures are used as examples in the embodiments of this application.

In the combined network shown in FIG. 2, the control plane network element in either of the networks can check a status of a data connection between the terminal device and the network; in addition, after determining the status of the data connection between the terminal device and the network, the control plane network element in the network may further send the status to the HSS in the combined network. Therefore, the HSS may also check the status of the data connection between the terminal device and the network.

In the combined network shown in FIG. 3, based on different manners of determining the terminal device and a second network, a procedure after the terminal device requests the control plane network element 1 in a first network (the LTE network or the SALTE network) to establish a first data connection to the first network (namely, a network access control procedure) may also be classified into two types:

A first type: If the control plane network element 2 in the second network (a network in the combined network other than the first network) checks a status of a second data connection between the terminal device and the second network, the procedure is similar to a specific procedure in the combined network shown in FIG. 2. For communication and interaction between the control plane network element 1 and the control plane network element 2, the HSS needs to serve as an intermediate node. Therefore, for the procedure, refer to the specific procedure in the combined network shown in FIG. 2, and details are not described herein again.

A second type: If the HSS in the combined network checks a status of a second data connection between the terminal device and the second network, the procedure includes the following:

The control plane network element 1 sends a status query request to the HSS.

The HSS determines whether the second data connection exists between the terminal device and the second network.

When determining that the second data connection does not exist, the HSS returns a first status message to the control plane network element 1, and the control plane network element 1 directly performs a procedure of establishing the first data connection. The first status message is used to indicate that the second data connection does not exist between the terminal device and the second network.

When determining that the second data connection exists, the HSS controls the terminal device or controls the control plane network element 2 to break the data connection to the second network, and instructs the control plane network element 1 or the terminal device to continue to perform a procedure of establishing the first data connection; or the HSS returns a second status message to the control plane network element 1, so that the control plane network element 1 controls, based on the second status message, the terminal device to stop the establishment of the first data connection or controls the terminal device to end the second data connection, and continues to perform a procedure of establishing the first data connection. The second status message is used to indicate that the second data connection exists between the terminal device and the second network.

According to the foregoing procedure, the HSS and/or the control plane network element 1 can ensure that the terminal device can have a data connection to only one network, ensure that the terminal device can normally transmit data, implement network access control on the terminal device, and avoid occurrence of a network connection error or a runtime error of the terminal device when the terminal device has a data connection to one network and forcibly establishes a data connection to another network.

It should be noted that, in this application, a specific operation of requesting, by the terminal device, to establish the first data connection to the first network is as follows:

The terminal device sends a data connection request for the first network to the control plane network element 1 (or the control plane network element in the combined network shown in FIG. 1) in the first network. The data connection request may be control plane signaling such as an attach request.

It can be learned from the foregoing descriptions that, in the combined networks shown in FIG. 1 to FIG. 3, if the terminal device already establishes the data connection to the second network, the first network device (namely, the control plane network element or the HSS) in the combined network can control the terminal device to stop the establishment of the data connection to the first network, or control the terminal device to break the data connection to the second network, to smoothly establish the data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

Figure 4:
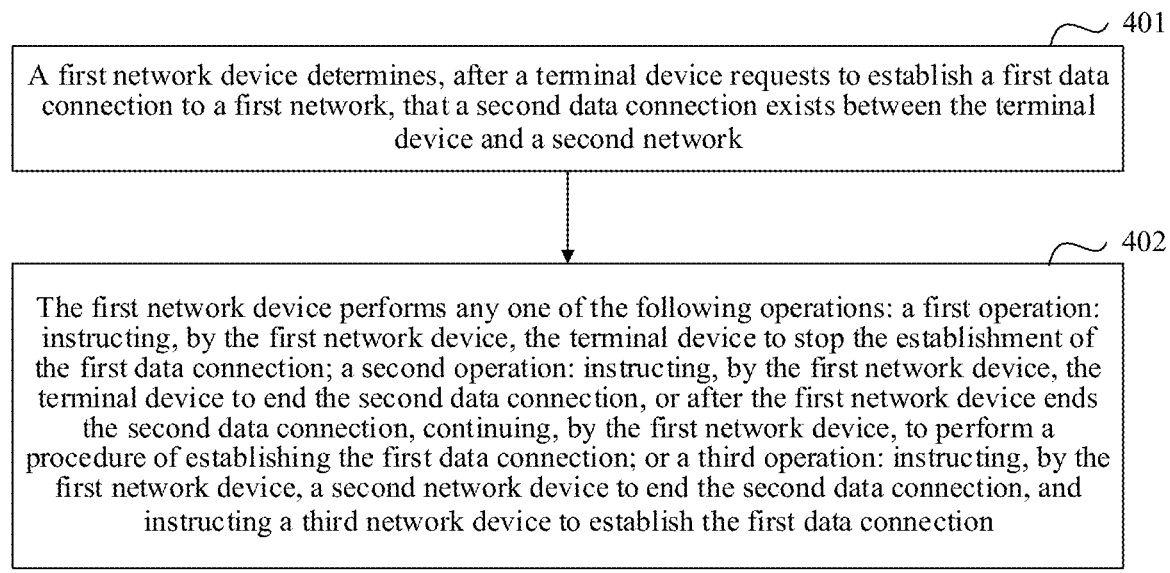
FIG. 4 shows a network access control method according to an embodiment of this application.

An embodiment of this application provides a network access control method. The method is applicable to various combined networks, and may be used in, but not limited to, the combined network shown in FIG. 1, FIG. 2, or FIG. 3. Referring to FIG. 4, a specific procedure of the method includes the following operations.

Operation 401: A first network device determines, after a terminal device requests to establish a first data connection to a first network, that a second data connection exists between the terminal device and a second network.

The first network is any network, for example, an SALTE network or an LTE network, in the combined network, and the second network is a network in the combined network other than the first network.

In one embodiment, the first network device is a network device in the combined network, and may include a control plane network element or an HSS. The control plane network element may be a network device deployed in the first network, for example, the control plane network element 1 in the combined network shown in FIG. 2 or FIG. 3; or may be a network element device deployed in the second network, for example, the control plane network element 2 in the combined network shown in FIG. 2 or FIG. 3; or may be a network device shared in the first network and the second network, for example, the control plane network element in the combined network shown in FIG. 1.

In one embodiment, before the determining, by a first network device, that a second data connection exists between the terminal device and the second network, the method further includes:

when the terminal device requests to establish the first data connection, if the terminal device sends a data connection request for the first network to the first network device, receiving, by the first network device, the data connection request for the first network sent by the terminal device. For example, in the combined network shown in FIG. 1, the control plane network element receives the data connection request for the first network sent by the terminal device; or when the terminal device requests to establish the first data connection, if the terminal device sends a data connection request for the first network to a fourth network device in the combined network, sending, by the fourth device, a status query request to the first network device, and receiving, by the first network device, the status query request sent by the fourth network device. The status query request is used to instruct the first network device to determine a status of the second data connection of the terminal device. For example, in the combined network shown in FIG. 2 or FIG. 3, the control plane network element 2 receives the status query request sent by the control plane network element 1.

In one embodiment, the determining, by a first network device, that the second data connection exists between the terminal device and the second network includes:

when the first network device is notified after the status of the second data connection of the terminal device is updated, detecting, by the first network device, that the second data connection exists between the terminal device and the second network; or when the first network device cannot directly determine the status of the second data connection, receiving, by the first network device, a status message sent by a fifth network device, and determining, based on the status message, that the second data connection exists between the terminal device and the second network, where the status message is used to indicate that the second data connection exists between the terminal device and the second network.

In one embodiment, when the second network is an LTE network, after the terminal device accesses the LTE network, the terminal device has two states in the second network: an idle state and a connected state. When the terminal device is in the connected state, a data connection exists between the terminal device and the LTE network. When the terminal device is in the idle state, no data connection exists, but only a control connection exists between the terminal device and the LTE network. Therefore, the terminal device can transmit user data to the LTE network only when the terminal is in the connected state in the LTE network.

It can be learned according to the foregoing descriptions that, when the second network is an LTE network, the determining, by a first network device, that the second data connection exists between the terminal device and the second network includes:

determining, by the first network device, that the terminal device is in a connected state in the second network.

Based on the foregoing manner, the first network determines that the terminal device is in the connected state in the second network, to determine that the second data connection exists.

Operation 402: The first network device performs any one of the following operations:

a first operation: instructing, by the first network device, the terminal device to stop the establishment of the first data connection;

a second operation: instructing, by the first network device, the terminal device to end the second data connection, or after the first network device ends the second data connection, continuing, by the first network device, to perform a procedure of establishing the first data connection; or a third operation: instructing, by the first network device, a second network device to end the second data connection, and instructing a third network device to establish the first data connection.

In a scenario in which the first network device performs the first operation,

In one embodiment, when the first network device performs the first operation, the method includes:

sending, by the first network device, an access stop message to the terminal device, where the access stop message is used to instruct the terminal device to stop the establishment of the first data connection.

According to the foregoing operation, if the terminal device already establishes the second data connection to the second network, the first network device controls the terminal device to stop the establishment of the first data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In one embodiment, the access stop message includes a status error cause, and the status error cause is used to notify that the second data connection exists between the terminal device and the second network.

According to the foregoing operation, the first network device can notify the terminal device of a reason for stopping the establishment of the first data connection.

In one embodiment, the sending, by the first network device, the access stop message to the terminal device includes:

forwarding, by the first network device, the access stop message to the terminal device by using another network device. For example, in the combined network shown in FIG. 2, the control plane network element 2 forwards the access stop message to the terminal device by using the control plane network element 1. For another example, in the combined network shown in FIG. 3, the control plane network element 2 forwards the access stop message to the terminal device by using the HSS and the control plane network element 1. For still another example, in the combined network shown in FIG. 3, after finding that the second data connection exists, the HSS forwards the access stop message to the terminal device by using the control plane network element 1.

According to the foregoing operation, the first network device can smoothly send the access stop message to the terminal device.

In a scenario in which the first network device performs the second operation,

In one embodiment, in a process of performing the second operation by the first network device, the instructing, by the first network device, the terminal device to end the second data connection includes:

sending, by the first network device, a first switching request message to the terminal device, where the first switching request message is used to instruct the terminal device to switch a data connection of the terminal device from the second data connection to the first data connection.

According to the foregoing operation, if the terminal device already establishes the second data connection to the second network, the first network device controls the terminal device to switch the second data connection to the first data connection, to smoothly establish the first data connection, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In one embodiment, the first switching request message includes a status error cause, and the status error cause is used to notify that the second data connection exists between the terminal device and the second network.

According to the foregoing operation, the first network device can notify the terminal device of a reason for switching the second data connection.

In one embodiment, the sending, by the first network device, a first switching request message to the terminal device includes:

forwarding, by the first network device, the first switching request message to the terminal device by using another network device. For example, in the combined network shown in FIG. 2, the control plane network element 2 forwards the first switching request message to the terminal device by using the control plane network element 1. For another example, in the combined network shown in FIG. 3, the control plane network element 2 forwards the first switching request message to the terminal device by using the HSS and the control plane network element 1. For still another example, in the combined network shown in FIG. 3, the HSS forwards the first switching request message to the terminal device by using the control plane network element 1.

According to the foregoing operation, the first network device can smoothly send the first switching request message to the terminal device.

In one embodiment, in a process of performing the second operation by the first network device, the first network device ends the second data connection in the following two ways:

First: The first network device initiates a release procedure of the second data connection. For example, the first network device initiates an S1-release procedure, to break an S1-1 connection between the access device and a control plane network element in the second network, and break an S1-2 connection between the access device and an S-GW in the second network. In this way, the terminal device can be in the idle state in the second network.

Second: The first network device switches a data connection of the terminal device from the second data connection to the first data connection. The first network device may directly initiate an optimized switching procedure, to switch the data connection of the terminal device to the first data connection.

According to the foregoing operation, if the terminal device already establishes the second data connection to the second network, the first network device directly ends the second data connection, to smoothly establish the first data connection, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

In one embodiment, the first network device continues to perform the procedure of establishing the first data connection. For example, the first network device performs a procedure of configuring the terminal device and a user plane network element in the first network device, and the like, to ensure user data transmission between the terminal device and the first network.

In a scenario in which the first network device performs the third operation,

In one embodiment, when the first network device performs the third operation, the instructing, by the first network device, the second network device to end the second data connection includes:

sending, by the first network device, a second switching request message to the second network device, where the second switching request message is used to instruct the second network device to switch a data connection of the terminal device from the second data connection to the first data connection. For example, in the combined network shown in FIG. 2, the control plane network element 2 sends the second switching request message to the control plane network element 1. For another example, in the combined network shown in FIG. 3, the control plane network element 2 sends the second switching request message to the control plane network element 1 by using the HSS. For still another example, in the combined network shown in FIG. 3, the HSS sends the second switching request message to the control plane network element 1.

According to the foregoing operation, if the terminal device already establishes the second data connection to the second network, the first network device controls the second network device to end the second data connection, to smoothly establish the first data connection, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

Optionally, the second switching request message includes a status error cause, and the status error cause is used to notify the second network device that the second data connection exists between the terminal device and the second network.

According to the foregoing operation, the first network device can notify the second network device of a reason for switching the data connection of the terminal device.

The foregoing operations and descriptions are a method for implementing network access control by the first network device on the premise that the first network device determines that the second data connection exists between the terminal device and the second network. In one embodiment, the network access control method provided in this embodiment of this application further includes:

after the terminal device requests to establish the first data connection to the first network, determining, by the first network device, that no data connection exists between the terminal device and the second network; and performing, by the first network device, the procedure of establishing the first data connection.

When the first network device determines that no data connection exists between the terminal device and the second network, the first network device may directly perform, by using a conventional data connection establishment method, the procedure of establishing the first data connection.

In one embodiment, when the second network is an LTE network, the determining, by the first network device, that no data connection exists between the terminal device and the second network includes:

determining, by the first network device, that the terminal device is in an idle state in the second network.

Based on the foregoing manner, the first network device determines that the terminal device is in the idle state in the second network, and determines that no data connection exists between the terminal device and the second network.

According to the network access control method provided in this embodiment of this application, if the terminal device already establishes the second data connection to the second network, the first network device controls the terminal device to stop the establishment of the first data connection to the first network, or controls the terminal device to end the second data connection to the second network, to smoothly establish the first data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

Figure 5:
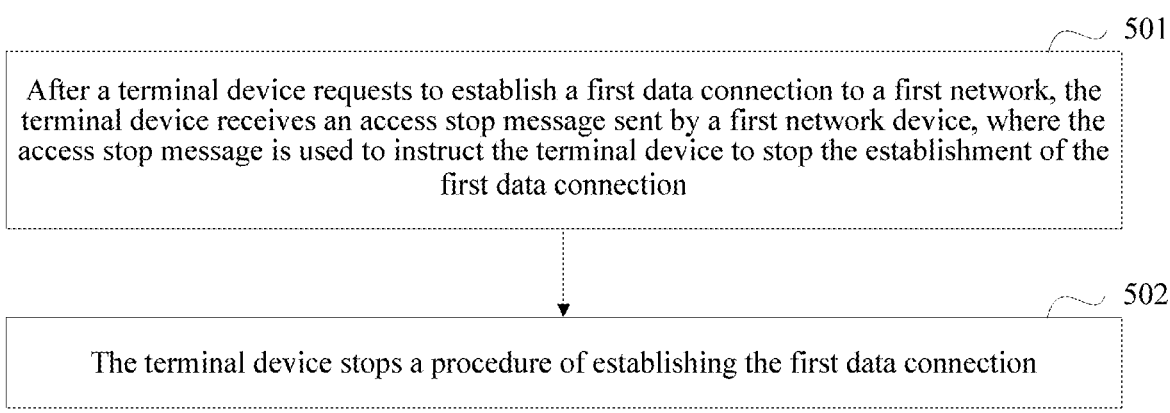
FIG. 5 shows another network access control method according to an embodiment of this application.

Based on the foregoing embodiment, an embodiment of this application further provides a network access control method. The method is applicable to various combined networks, and may be used in, but not limited to, the combined network shown in FIG. 1, FIG. 2, or FIG. 3. Referring to FIG. 5, a specific procedure of the method includes the following operations.

Operation 501: After a terminal device requests to establish a first data connection to a first network, the terminal device receives an access stop message sent by a first network device, where the access stop message is used to instruct the terminal device to stop the establishment of the first data connection.

In one embodiment, the access stop message includes a status error cause, and the status error cause is used to notify that the second data connection exists between the terminal device and the second network.

In one embodiment, the receiving, by the terminal device, the access stop message sent by the first network device includes:

receiving, by the terminal device by using another network device, the access stop message sent by the first network device. For example, in the combined network shown in FIG. 2, the terminal device receives, by using the control plane network element 1, the access stop message sent by the control plane network element 2. For another example, in the combined network shown in FIG. 3, the terminal device receives, by using the control plane network element 1 and the HSS, the access stop message sent by the control plane network element 2. For still another example, in the combined network shown in FIG. 3, the terminal device receives, by using the control plane network element 1, the access stop message sent by the HSS.

According to the foregoing operation, the terminal device can smoothly receive the access stop message sent by the first network device.

In one embodiment, the terminal device requests, in the following two ways, to establish the first data connection to the first network:

First: The terminal device sends a data connection request for the first network to the first network device. For example, in the combined network shown in FIG. 1, the terminal device sends the data connection request to the control plane network element.

Second: The terminal device sends a data connection request for the first network to the another network device. For example, in the combined network shown in FIG. 2 or FIG. 3, the terminal device sends the data connection request to the control plane network element 1. In one embodiment, after receiving the data connection request, the another network device sends a status query request to the first network device, so that the first network device determines that the second data connection exists between the terminal device and the second network; or after receiving the data connection request, the another network device determines that the second data connection exists between the terminal device and the second network, and sends a status message to the first network device, where the status message is used to indicate that the second data connection exists between the terminal device and the second network.

Operation 502: The terminal device stops a procedure of establishing the first data connection.

According to the network access control method provided in this embodiment of this application, after the terminal device requests to establish the first data connection to the first network, the terminal device receives the access stop message sent by the first network device, and stops the procedure of establishing the first data connection, to avoid occurrence of a network connection error or a runtime error of the terminal device when a data connection is forcibly established to the first network.

Figure 6:
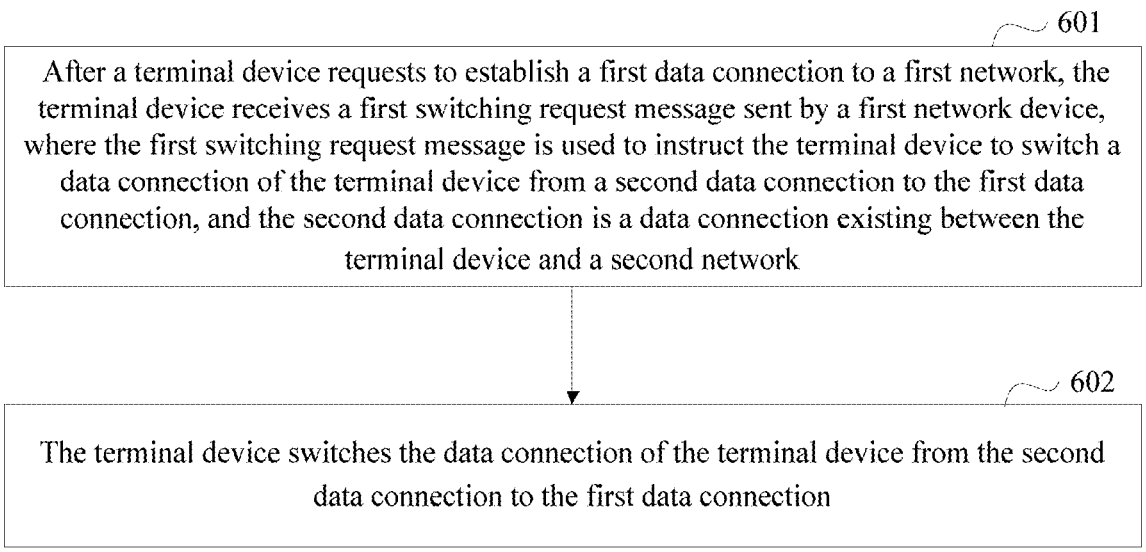
FIG. 6 shows still another network access control method according to an embodiment of this application.

Based on the foregoing embodiment, an embodiment of this application further provides a network access control method. The method is applicable to various combined networks, and may be used in, but not limited to, the combined network shown in FIG. 1, FIG. 2, or FIG. 3. Referring to FIG. 6, a specific procedure of the method includes the following operations.

Operation 601: After a terminal device requests to establish a first data connection to a first network, the terminal device receives a first switching request message sent by a first network device, where the first switching request message is used to instruct the terminal device to switch a data connection of the terminal device from a second data connection to the first data connection, and the second data connection is a data connection existing between the terminal device and a second network.

In one embodiment, the first switching request message includes a status error cause, and the status error cause is used to notify that the second data connection exists between the terminal device and the second network.

In one embodiment, the receiving, by the terminal device, the first switching request message sent by the first network device includes:

receiving, by the terminal device by using another network device, the first switching request message sent by the first network device. For example, in the combined network shown in FIG. 2, the terminal device receives, by using the control plane network element 1, the first switching request message sent by the control plane network element 2. For another example, in the combined network shown in FIG. 3, the terminal device receives, by using the HSS and the control plane network element 1, the first switching request message sent by the control plane network element 2. For still another example, in the combined network shown in FIG. 3, the terminal device receives, by using the control plane network element 1, the first switching request message forwarded by the HSS.

According to the foregoing operation, the terminal device can smoothly receive the first switching request message sent by the first network device.

In one embodiment, the terminal device requests, in the following two ways, to establish the first data connection to the first network:

First: The terminal device sends a data connection request for the first network to the first network device. For example, in the combined network shown in FIG. 1, the terminal device sends the data connection request to the control plane network element.

Second: The terminal device sends a data connection request for the first network to the another network device. For example, in the combined network shown in FIG. 2 or FIG. 3, the terminal device sends the data connection request to the control plane network element 1. In one embodiment, after receiving the data connection request, the another network device sends a status query request to the first network device, so that the first network device determines that the second data connection exists between the terminal device and the second network; or after receiving the data connection request, the another network device determines that the second data connection exists between the terminal device and the second network, and sends a status message to the first network device, where the status message is used to indicate that the second data connection exists between the terminal device and the second network.

Operation 602: The terminal device switches the data connection of the terminal device from the second data connection to the first data connection.

According to the network access control method provided in this embodiment of this application, after the terminal device requests to establish the first data connection to the first network, the terminal device receives a first switching access message sent by the first network device, and switches the data connection of the terminal device from the second data connection to the first data connection, to avoid occurrence of a network connection error or a runtime error of the terminal device when a data connection is forcibly established to the first network if the second data connection is not broken.

In the combined networks shown in FIG. 1 to FIG. 3, network access scenarios of the terminal device are classified into two types: In a first network access scenario, the terminal device requests to establish a data connection to the LTE network; and in a second network access scenario, the terminal device requests to establish a data connection to the SALTE network. In subsequently provided examples of the network access control method in this application, only the second network access scenario is used as an example for description.

Example 1

Figure 7:
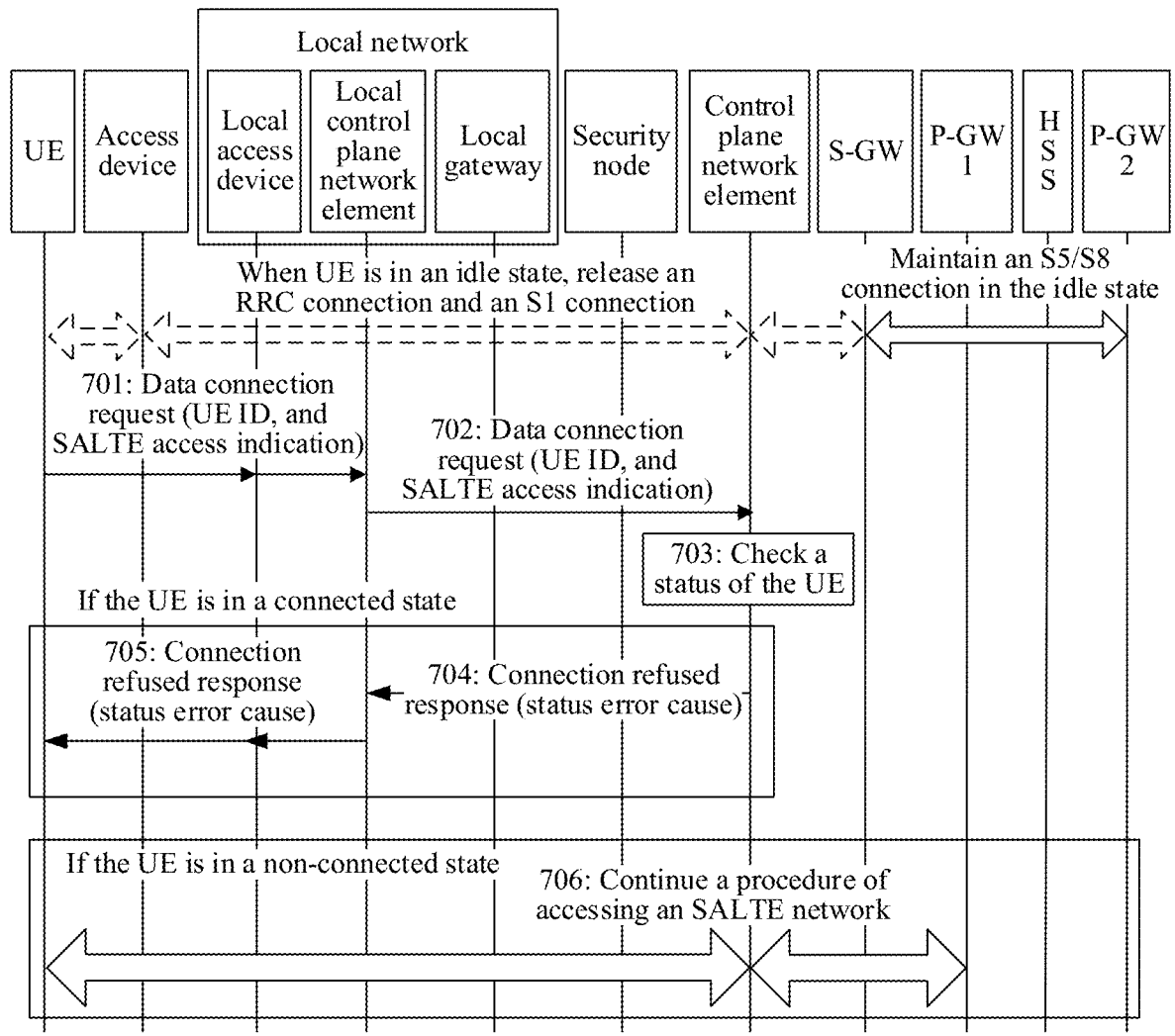
FIG. 7 is a first flowchart of an example of a network access control method according to an embodiment of this application.

In the architecture of the combined network shown in FIG. 1, referring to FIG. 7, a specific procedure of an example of the network access control method includes the following operations.

Operation 701: UE sends a data connection request to the local control plane network element, where the data connection request carries an SALTE access indication and a UE identifier (ID).

The SALTE transition indication is used to indicate that the UE already accesses the LTE network, and now a DC mode is started to access the SALTE network.

In one embodiment, the UE ID may be a globally unique temporary UE identity (GUTI).

Operation 702: The local control plane network element sends the data connection request to the control plane network element.

Operation 703: After receiving the data connection request, the control plane network element checks a status of the UE corresponding to the UE ID in the LTE network according to the SALTE transition indication.

If the UE is in a connected state, the following operations are included:

Operation 704 and operation 705: The control plane network element sends a connection refused response (also referred to as an access stop message) to the UE by using the local control plane network element, where the connection refused response may include a status error cause.

After receiving the connection refused response, the UE stops a procedure of accessing the SALTE network.

If the UE is in a non-connected state (an idle state), the following operation is included:

Operation 706: The control plane network element continues a procedure of accessing the SALTE network.

Example 2

Figure 8:
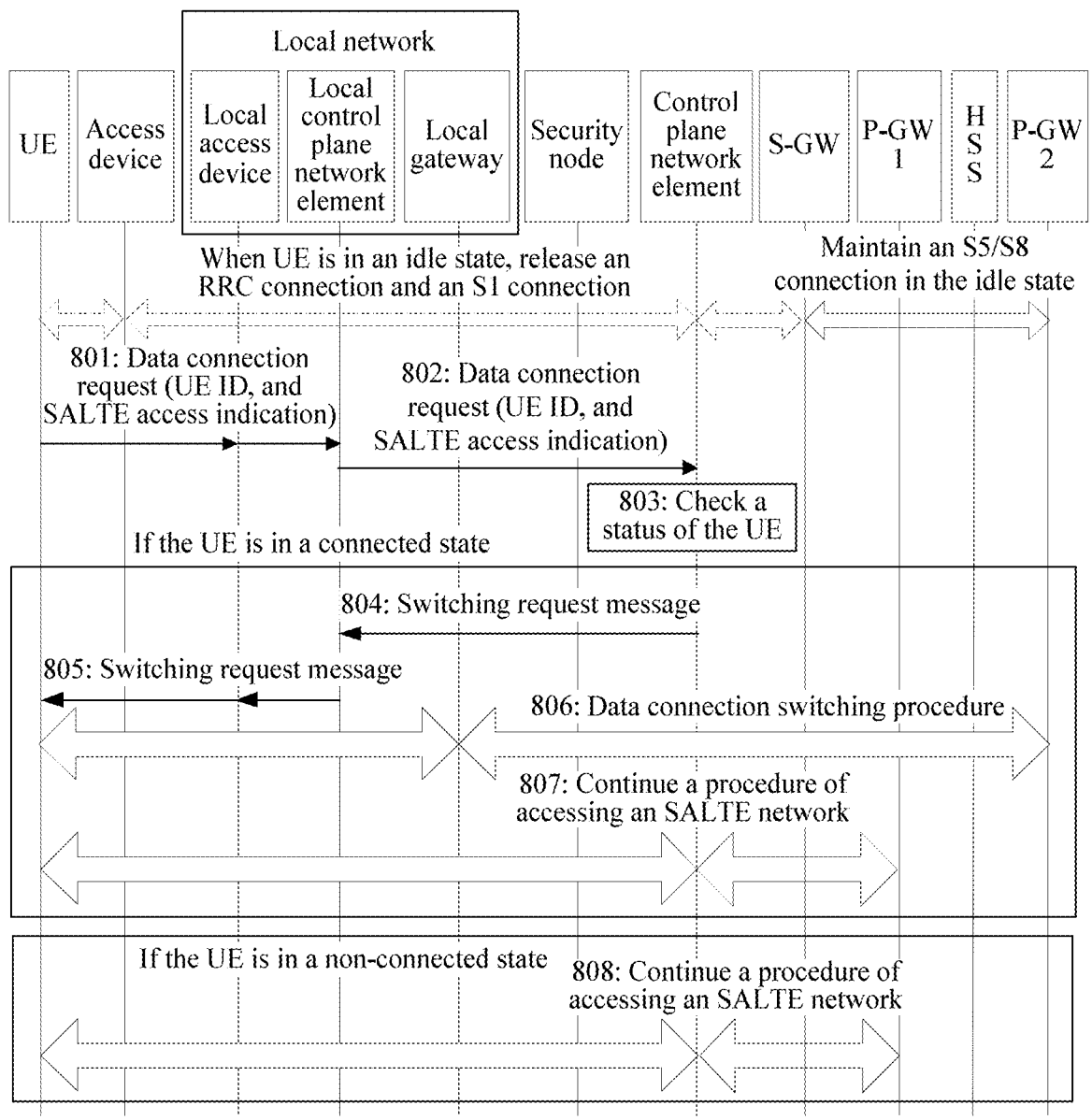
FIG. 8 is a second flowchart of an example of a network access control method according to an embodiment of this application.

In the architecture of the combined network shown in FIG. 1, referring to FIG. 8, a specific procedure of an example of the network access control method includes the following operations.

Operation 801 to operation 803 are the same as operation 701 to operation 703 in Example 1, and operation 808 when the UE is in a non-connected state is also the same as operation 706 in Example 1. Details are not described herein again.

A difference from Example 1 lies in that, operations performed when the UE is in a connected state are different.

Operation 804-805: The control plane network element sends a switching request message to the UE by using the local control plane network element. In one embodiment, the switching request message may include a status error cause.

Operation 806: After receiving the switching request message, the UE initiates a data connection switching procedure.

The switching procedure is as follows: The UE switches a data connection of the UE from a data connection between the UE and the LTE network to a data connection between the UE and the SALTE network.

Operation 807: The control plane network element continues a procedure of accessing the SALTE network.

Example 3

Figure 9:
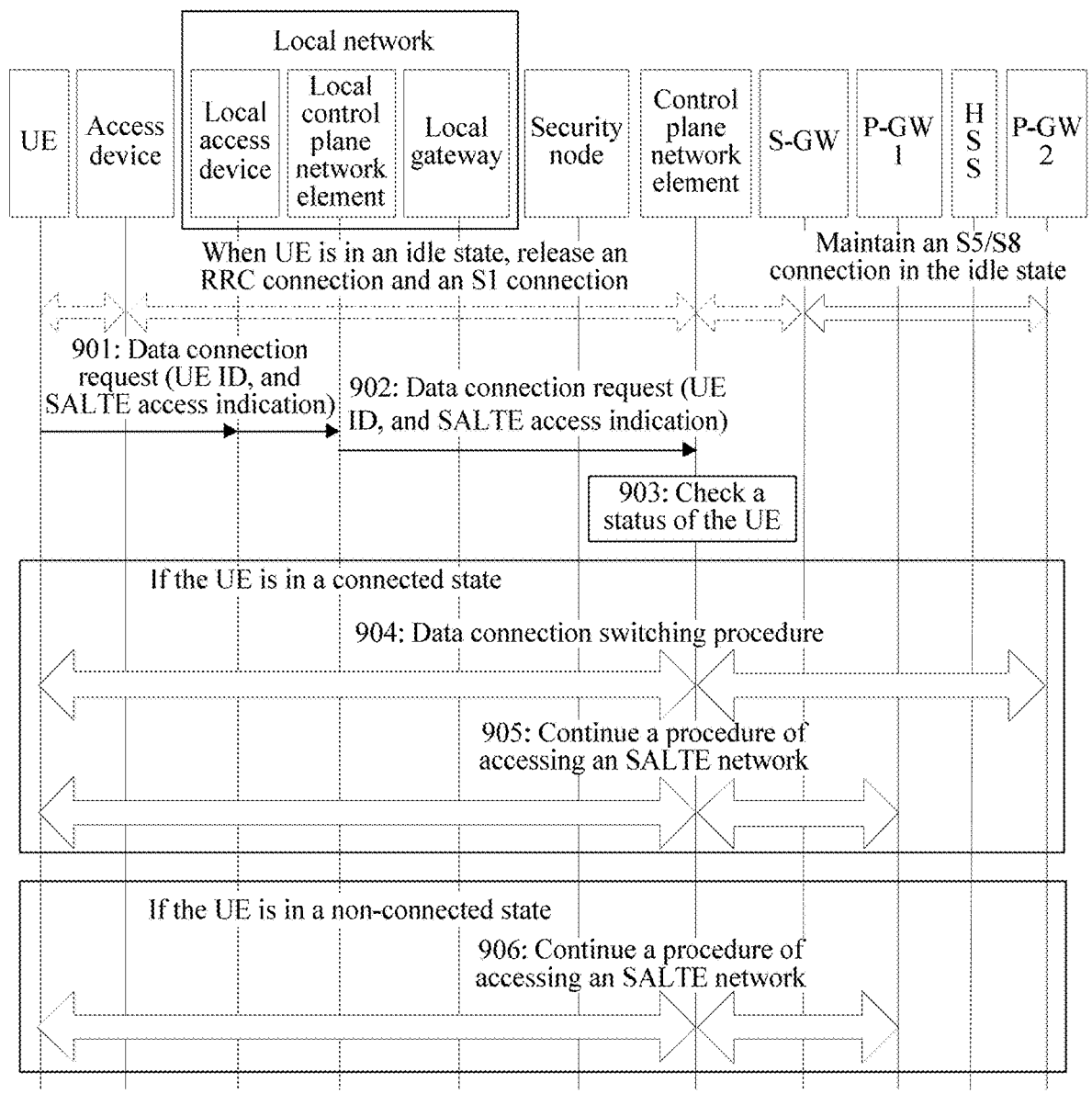
FIG. 9 is a third flowchart of an example of a network access control method according to an embodiment of this application.

In the architecture of the combined network shown in FIG. 1, referring to FIG. 9, a specific procedure of an example of the network access control method includes the following operations.

Operation 901 to 903 are the same as operation 701 to operation 703 in Example 1, and operation 906 when the UE is in a non-connected state is also the same as operation 706 in Example 1. Details are not described herein again.

A difference from Example 1 lies in that, operations performed when the UE is in a connected state are different.

Operation 904: The control plane network element initiates a switching process, to switch a data connection of the UE from a data connection between the UE and the LTE network to a data connection between the UE and the SALTE network.

Operation 905: The control plane network element continues a procedure of accessing the SALTE network.

Example 4

Figure 10:
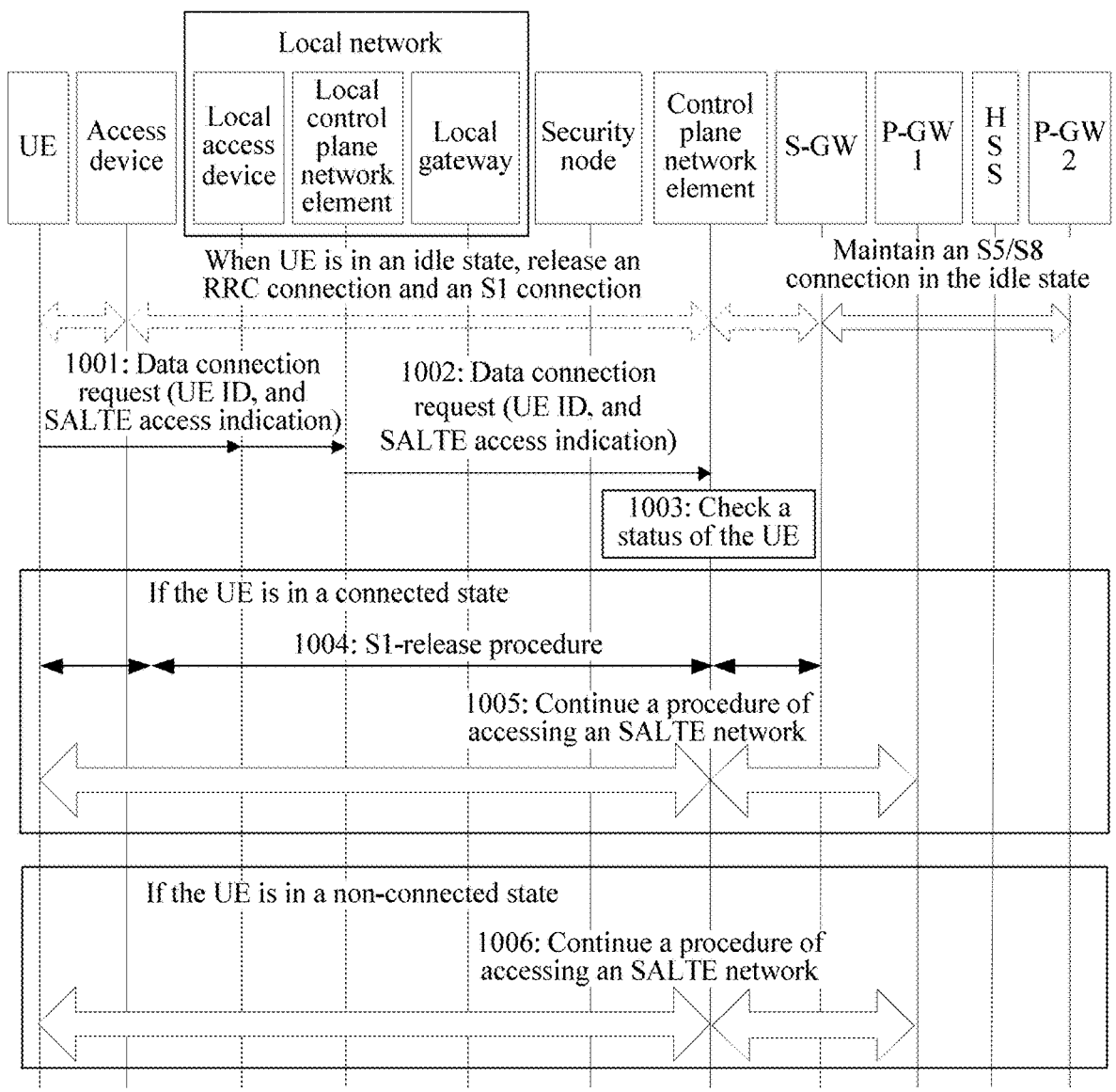
FIG. 10 is a fourth flowchart of an example of a network access control method according to an embodiment of this application.

In the architecture of the combined network shown in FIG. 1, referring to FIG. 10, a specific procedure of an example of the network access control method includes the following operations.

Operation 1001 to operation 1003 are the same as operation 701 to operation 703 in Example 1, and operation 1006 when the UE is in a non-connected state is also the same as operation 706 in Example 1. Details are not described herein again.

A difference from Example 1 lies in that, operations performed when the UE is in a connected state are different.

Operation 1004: The control plane network element initiates an S1-release procedure, so that the status of the UE in the LTE network changes to the non-connected state.

Operation 1005: The control plane network element continues a procedure of accessing the SALTE network.

Example 5

Figure 11:
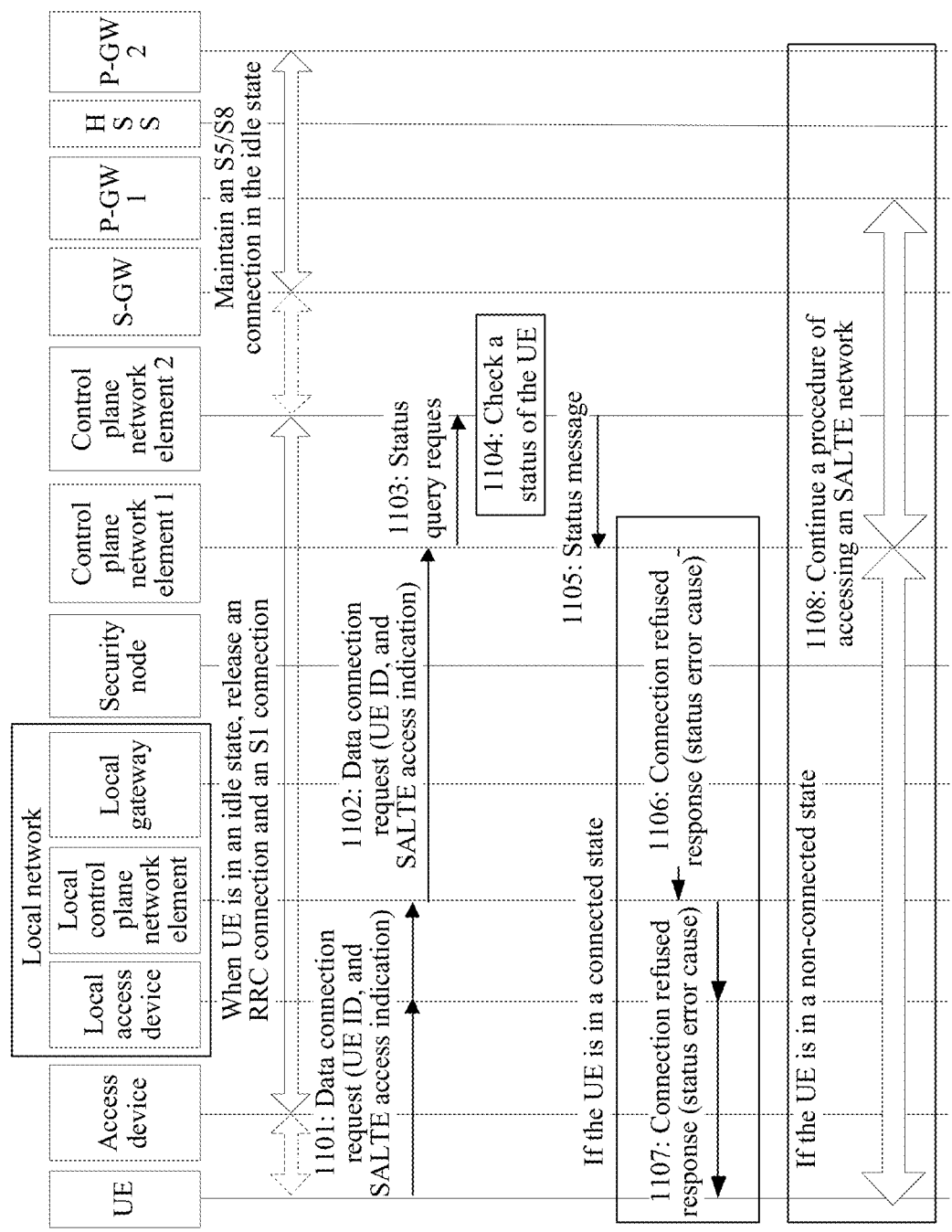
FIG. 11 is a fifth flowchart of an example of a network access control method according to an embodiment of this application.

In the architecture of the combined network shown in 2, referring to FIG. 11, a specific procedure of an example of the network access control method includes the following operations.

Operation 1101: UE sends a data connection request to the local control plane network element, where the data connection request carries an SALTE access indication and a UE ID.

The SALTE access indication is used to indicate that the UE already accesses the LTE network, and now a DC mode is started to access the SALTE network.

In one embodiment, the UE ID may be a globally unique temporary UE identity (GUTI).

Operation 1102: The local control plane network element sends the data connection request to the control plane network element 1 in the SALTE network.

Operation 1103: After receiving the data connection request, the control plane network element 1 sends a status query request to the control plane network element 2 in the LTE network according to the SALTE transition indication. The status query request is used to instruct the control plane network element 2 to check a status of the UE in the LTE network.

In one embodiment, the status query request includes the UE ID.

Operation 1104: The control plane network element 2 checks a status of the UE, to determine the status of the UE in the LTE network.

Operation 1105: The control plane network element 2 sends a status message to the control plane network element 1. The status message is used to notify the control plane network element 1 of the status of the UE in the LTE network.

If the UE is in a connected state, the following operations are included:

Operation 1106 and operation 1107: The control plane network element 1 sends a connection refused response (also referred to as an access stop message) to the UE by using the local control plane network element, where the connection refused response may include a status error cause.

After receiving the connection refused response, the UE stops a procedure of accessing the SALTE network.

If the UE is in a non-connected state (an idle state), the following operation is included:

Operation 1108: The control plane network element 1 continues a procedure of accessing the SALTE network.

Example 6

Figure 12:
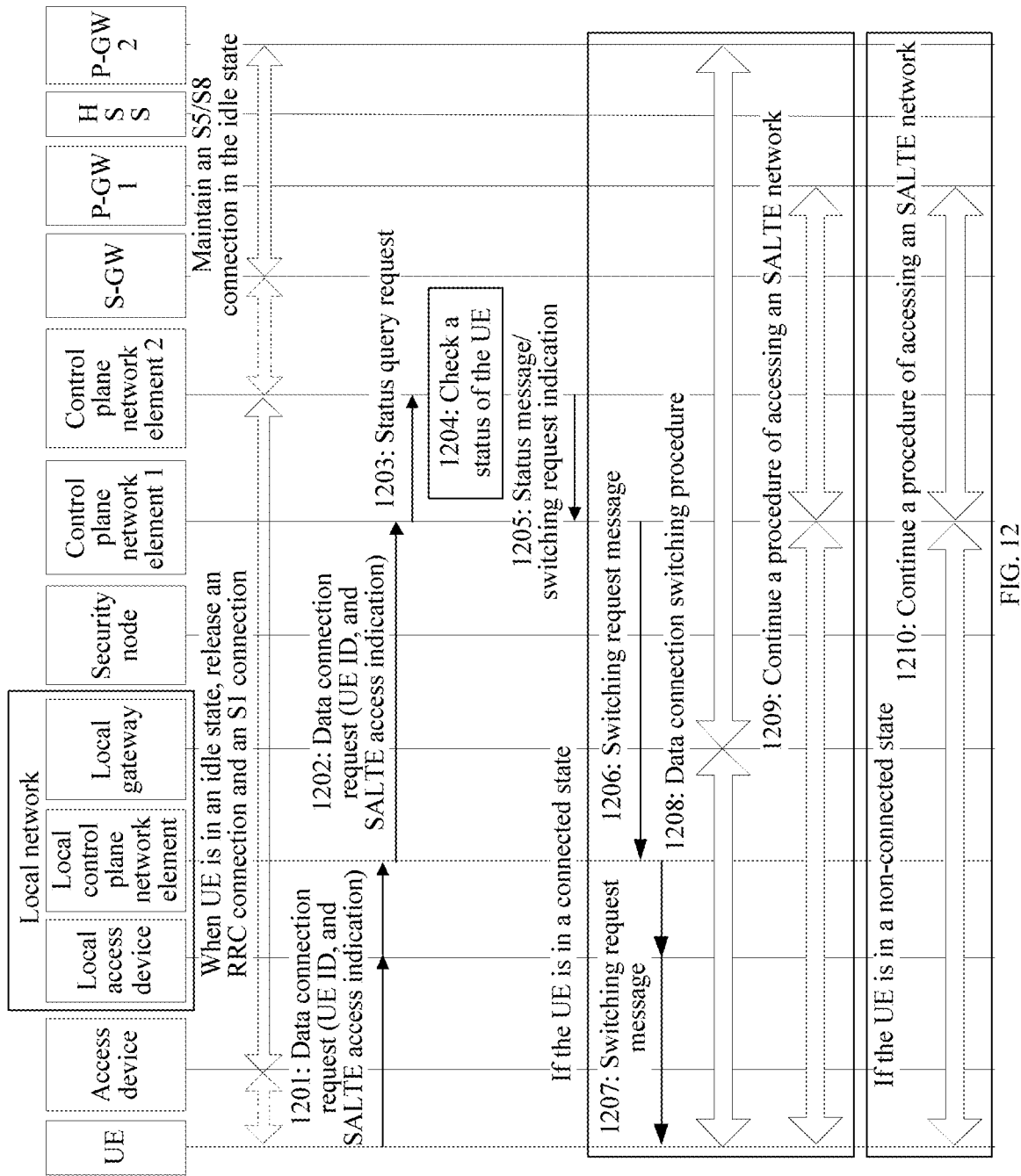
FIG. 12 is a sixth flowchart of an example of a network access control method according to an embodiment of this application.

In the architecture of the combined network shown in 2, referring to FIG. 12, a specific procedure of an example of the network access control method includes the following operations.

Operation 1201 to operation 1204 are the same as operation 1101 to operation 1104 in Example 5, and operation 1210 when the UE is in a non-connected state is also the same as operation 1108 in Example 5. Details are not described herein again.

A difference from Example 5 lies in:

Operation 1205: After determining the status of the UE in the LTE network, send a status message to the control plane network element 1, and further, when determining that the UE is in a connected state in the LTE network, directly send a switching request indication (also referred to as a second switching request message in the foregoing embodiment) to the control plane network element 1.

The status message is used to notify the control plane network element 1 of the status of the UE in the LTE network.

The second switching request message is used to instruct the control plane network element 1 to switch a data connection of the terminal device from the second data connection to the first data connection.

Operations performed when the UE is in the connected state are different:

Operation 1206 and operation 1207: When receiving the status message indicating that the UE is in the connected state or when receiving the switching request indication, the control plane network element 1 sends a switching request message (also referred to as a first switching request message in the foregoing embodiment) to the UE by using the local control plane network element.

The switching request message may include a status error cause.

Operation 1208: The UE initiates a data connection switching procedure after receiving the switching request message.

The switching procedure is as follows: The UE switches a data connection of the UE from a data connection between the UE and the LTE network to a data connection between the UE and the SALTE network.

operation 1209: The control plane network element 1 continues a procedure of accessing the SALTE network.

Example 7

Figure 13:
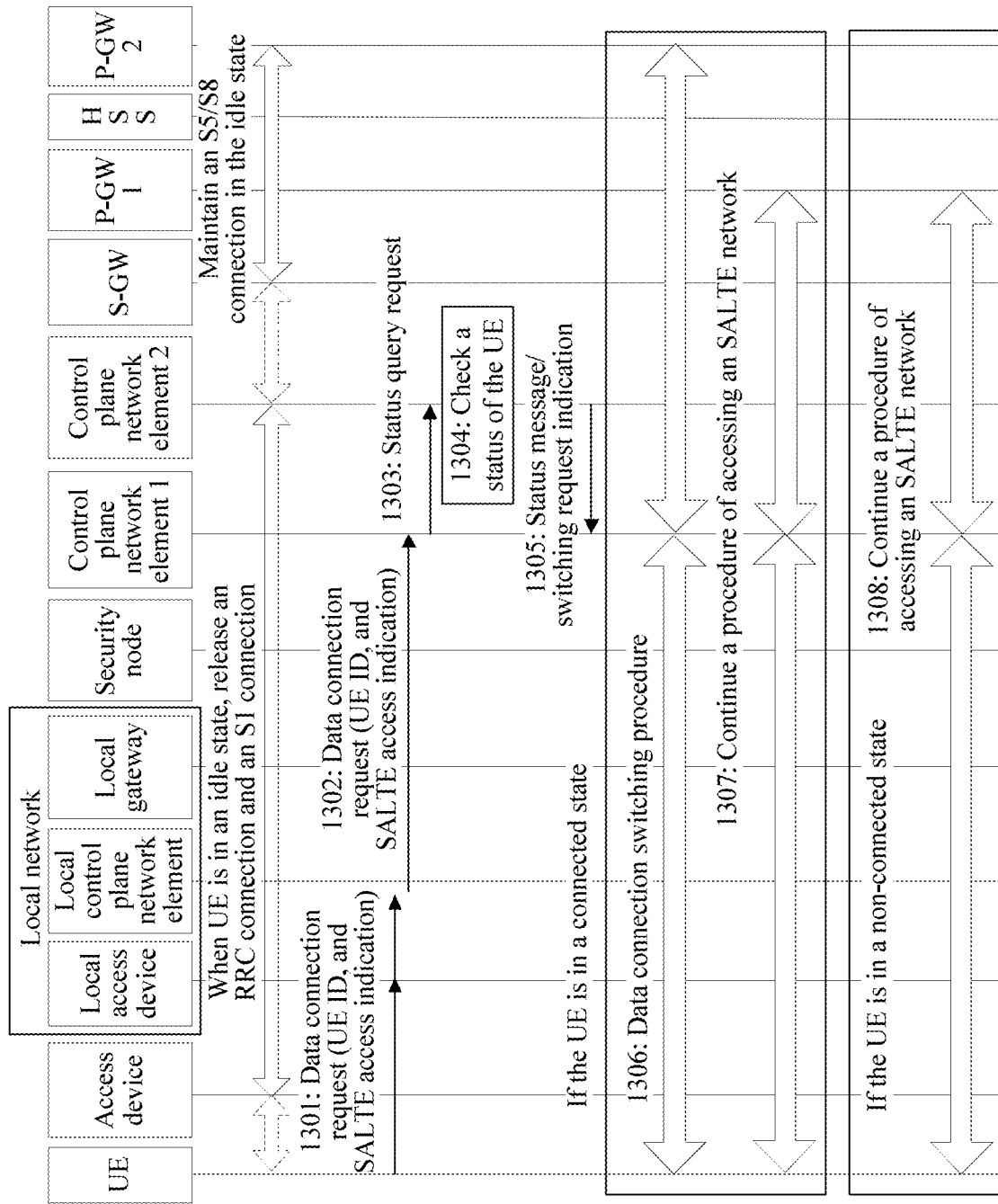
FIG. 13 is a seventh flowchart of an example of a network access control method according to an embodiment of this application.

In the architecture of the combined network shown in 2, referring to FIG. 13, a specific procedure of an example of the network access control method includes the following operations.

Operation 1301 to operation 1305 are the same as operation 1201 to operation 1205 in Example 6, and operation 1308 when the UE is in a non-connected state is also the same as operation 1210 in Example 6. Details are not described herein again.

A difference from Example 6 lies in that, operations performed when the UE is in a connected state are different.

Operation 1306: When receiving the status message indicating that the UE is in the connected state or when receiving the switching request indication, the control plane network element 1 initiates a switching process, to switch a data connection of the UE from a data connection between the UE and the LTE network to a data connection between the UE and the SALTE network.

Operation 1307: The control plane network element continues a procedure of accessing an SALTE network.

Example 8

Figure 14:
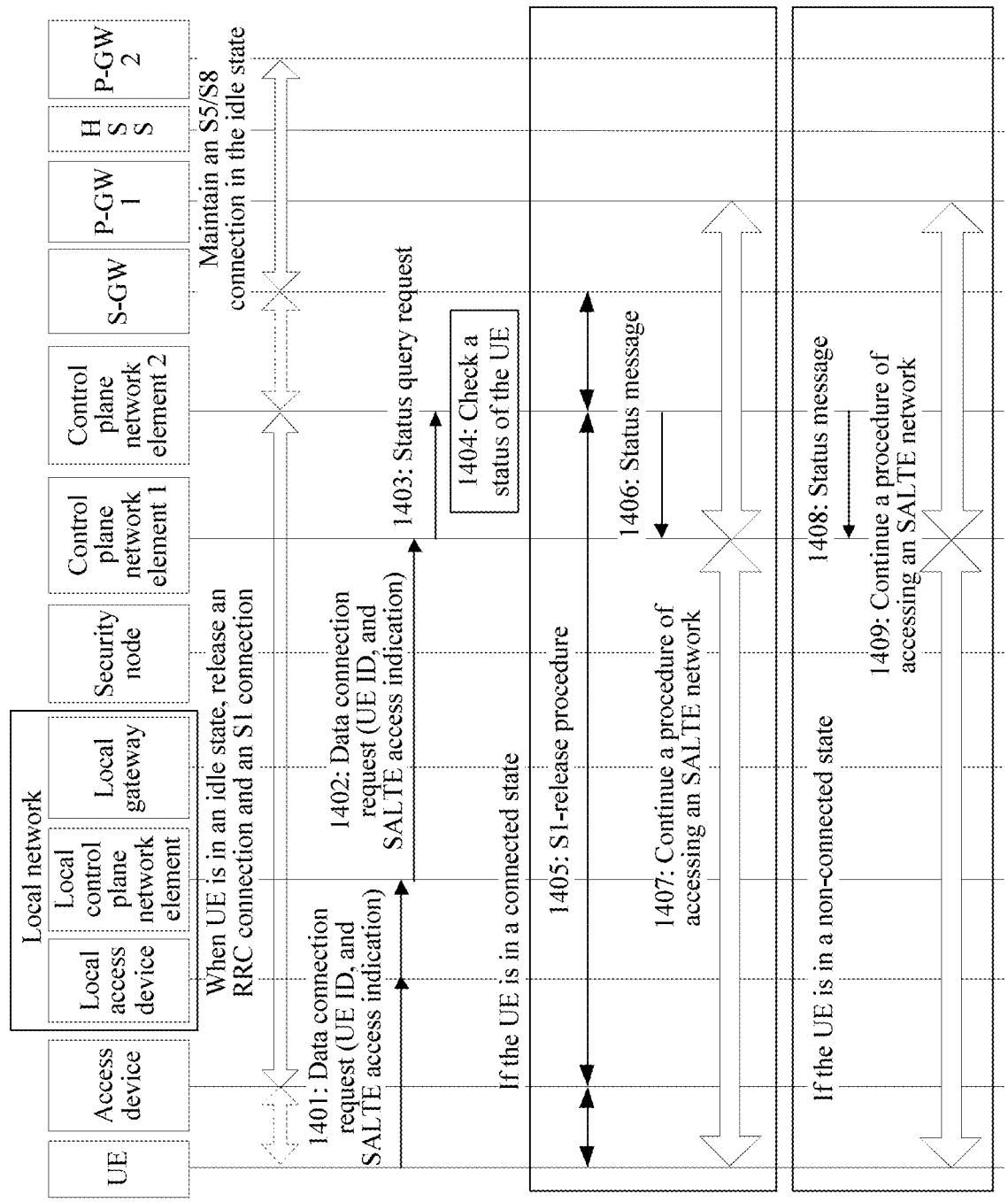
FIG. 14 is an eighth flowchart of an example of a network access control method according to an embodiment of this application.

In the architecture of the combined network shown in 2, referring to FIG. 14, a specific procedure of an example of the network access control method includes the following operations.

Operation 1401 to operation 1404 are the same as operation 1101 to operation 1104 in Example 5. Details are not described herein again.

A difference from Example 5 lies in that:

Operations performed when the UE is in a connected state are different.

Operation 1405: The control plane network element 2 determines that the UE is in the connected state in the LTE network, and the control plane network element initiates an S1-release procedure, so that the status of the UE in the LTE network changes to a non-connected state (an idle state).

Operation 1406: The control plane network element 2 sends a status message of the UE at this time to the control plane network element 1, where the status message is used to notify the control plane network element 1 that the UE is in the non-connected state in the LTE network at this time.

Operation 1407: The control plane network element 1 continues a procedure of accessing the SALTE network.

Operations performed when the UE is in the connected state are different.

Operation 1408 and operation 1409 are the same as operation 1406 and operation 1407. Details are not described herein again Example 9

Figure 15:
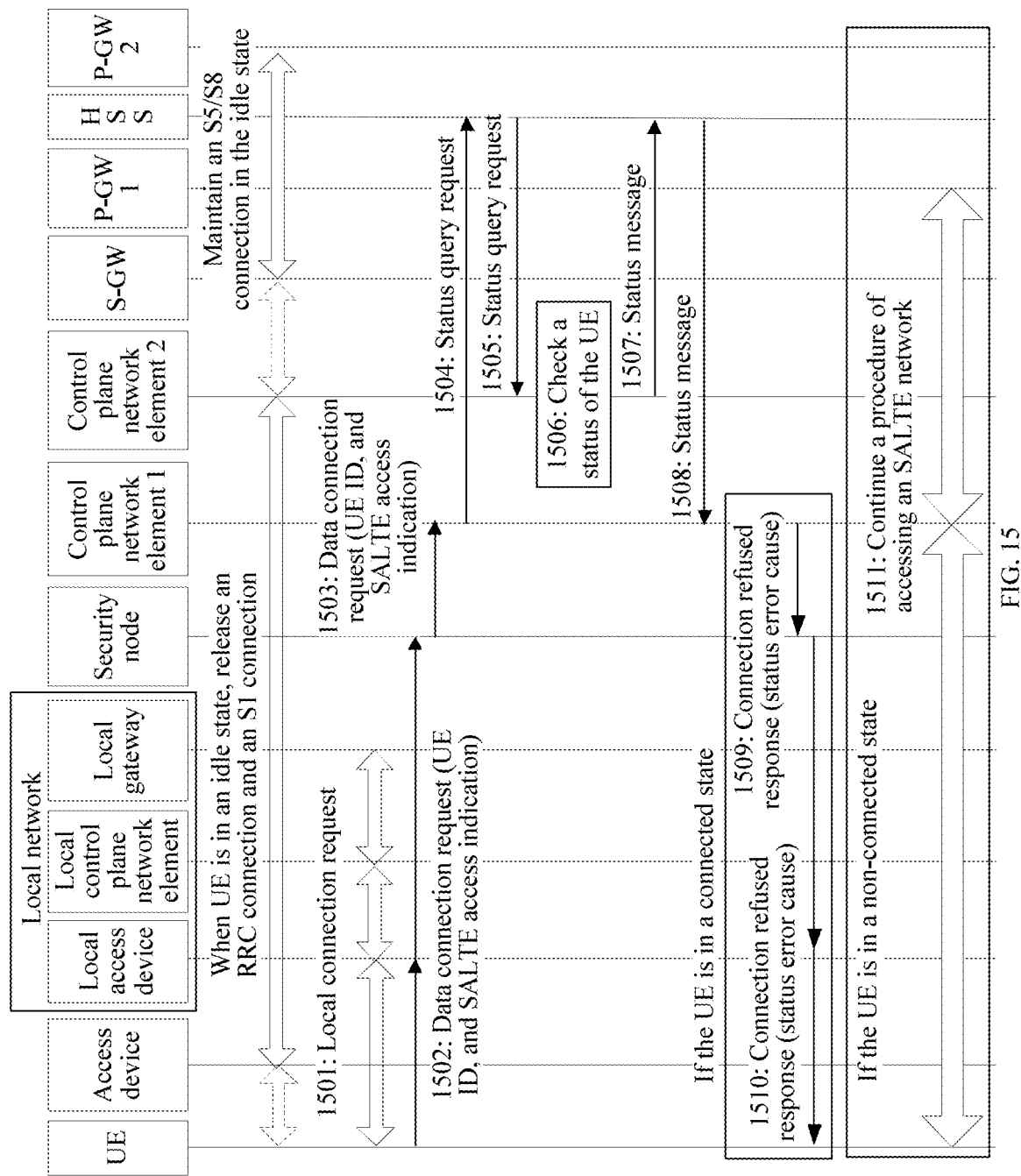
FIG. 15 is a ninth flowchart of an example of a network access control method according to an embodiment of this application.

In the architecture of the combined network shown in FIG. 3, referring to FIG. 15, a specific procedure of an example of the network access control method includes the following operations.

Operation 1501: UE sends a local connection request to the local access device, the local control plane network element, and the local gateway in the local network.

Operation 1502: The UE sends a data connection request to the security node based on the Internet Key Exchange Version 2 (IKEv2) protocol by using the local access device, where the data connection request carries an SALTE access indication and a UE ID.

The SALTE access indication is used to indicate that the UE already accesses the LTE network, and now a DC mode is started to access the SALTE network.

In one embodiment, the UE ID may be a globally unique temporary UE identity (GUTI).

Operation 1503: The security node sends the data connection request to the control plane network element 1 in the SALTE network.

Operation 1504 and operation 1505: After receiving the data connection request, the control plane network element 1 sends a status query request to the control plane network element 2 in the LTE network according to the SALTE transition indication by using the HSS. The status query request is used to instruct the control plane network element 2 to check a status of the UE in the LTE network.

In one embodiment, the status query request includes the UE ID.

Operation 1506: The control plane network element 2 checks a status of the UE, to determine the status of the UE in the LTE network.

Operation 1507 and operation 1508: The control plane network element 2 sends a status message to the control plane network element 1 by using the HSS. The status message is used to notify the control plane network element 1 of the status of the UE in the LTE network.

If the UE is in a connected state, the following operations are included:

Operation 1509 and 1510: The control plane network element 1 sends a connection refused response (also referred to as an access stop message) to the UE by using the security node, where the connection refused response may include a status error cause.

After receiving the connection refused response, the UE stops a procedure of accessing the SALTE network.

If the UE is in a non-connected state (an idle state), the following operation is included:

Operation 1511: The control plane network element 1 continues a procedure of accessing the SALTE network.

Example 10

Figure 16:
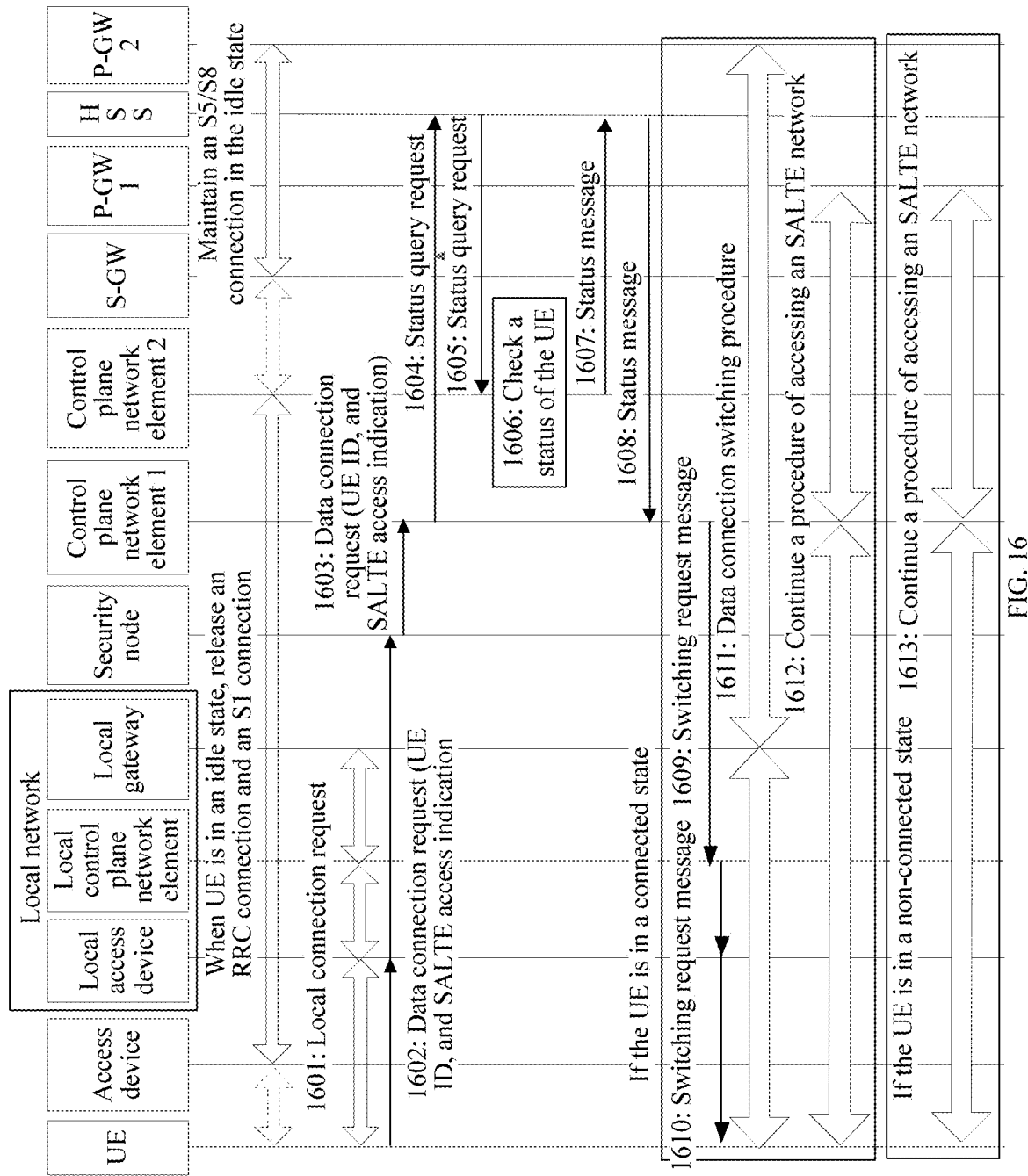
FIG. 16 is a tenth flowchart of an example of a network access control method according to an embodiment of this application.

In the architecture of the combined network shown in FIG. 3, referring to FIG. 16, a specific procedure of an example of the network access control method includes the following operations.

Operation 1601 to operation 1608 are the same as operation 1501 to operation 1508 in Example 9. Details are not described herein again.

Subsequent operation 1609 to operation 1613 are the same as operation 1206 to operation 1210 in Example 6. Details are not described herein again.

Example 11

Figure 17:
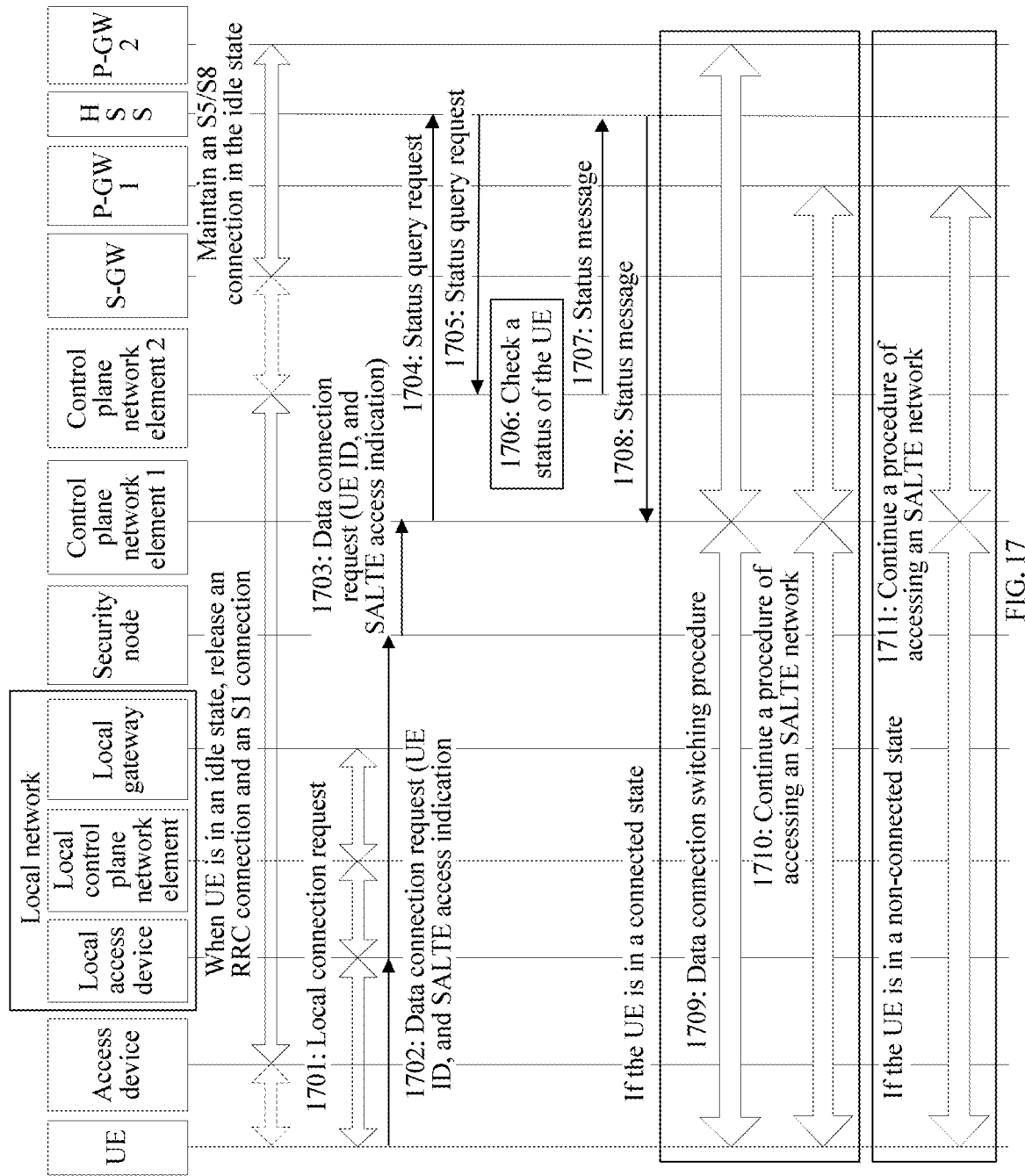
FIG. 17 is an eleventh flowchart of an example of a network access control method according to an embodiment of this application.

In the architecture of the combined network shown in FIG. 3, referring to FIG. 17, a specific procedure of an example of the network access control method includes the following operations.

Operation 1701 to operation 1708 are the same as operation 1501 to operation 1508 in Example 9. Details are not described herein again.

Subsequent operation 1709 to operation 1711 are the same as operation 1306 to operation 1308 in Example 7. Details are not described herein again.

Example 12

Figure 18:
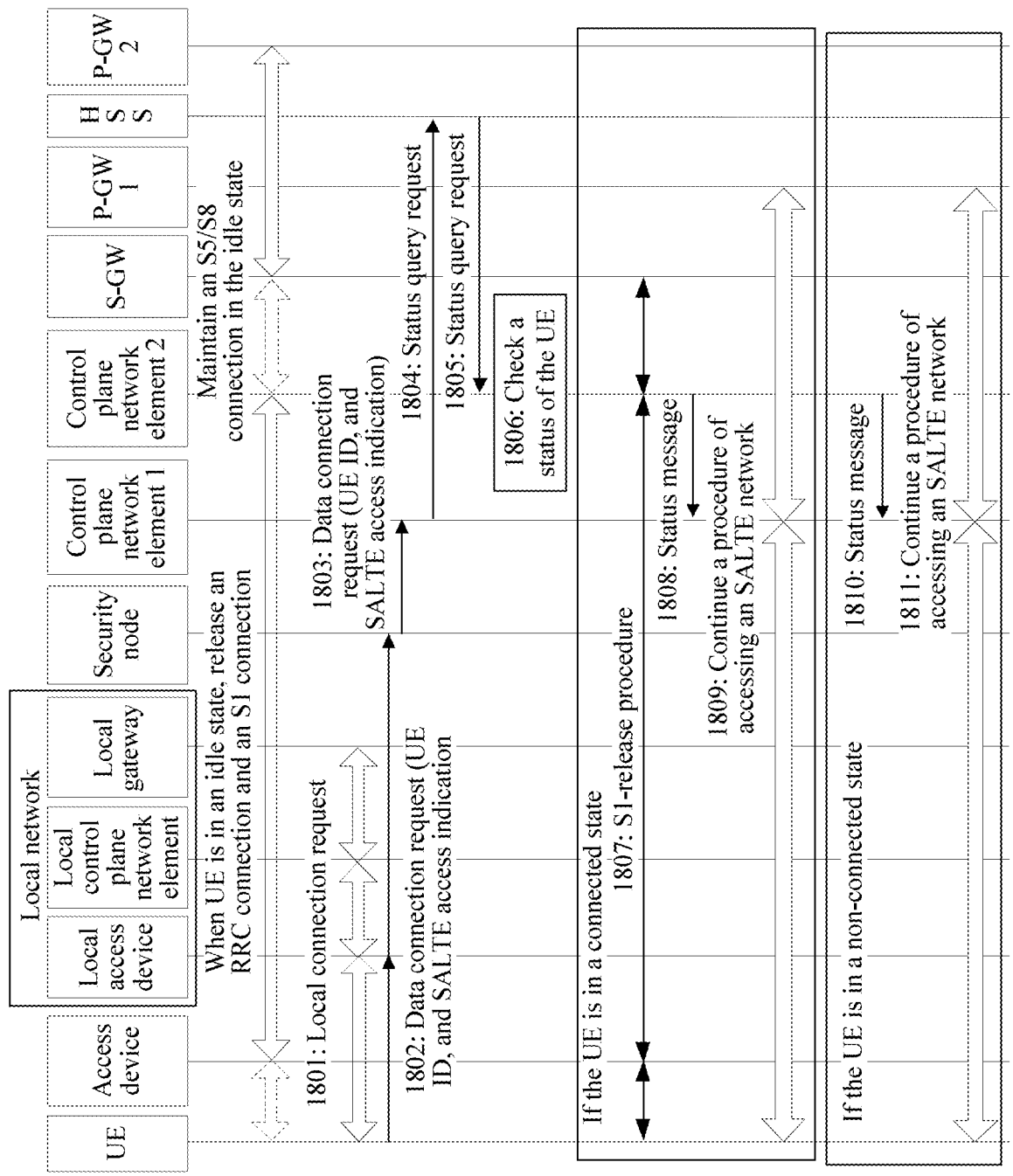
FIG. 18 is a twelfth flowchart of an example of a network access control method according to an embodiment of this application.

In the architecture of the combined network shown in FIG. 3, referring to FIG. 18, a specific procedure of an example of the network access control method includes the following operations.

Operation 1801 to operation 1806 are the same as operation 1501 to operation 1506 in Example 9. Details are not described herein again.

Subsequent operation 1807 to operation 1811 are the same as operation 1405 to operation 1409 in Example 8. Details are not described herein again.

Example 13

Figure 19:
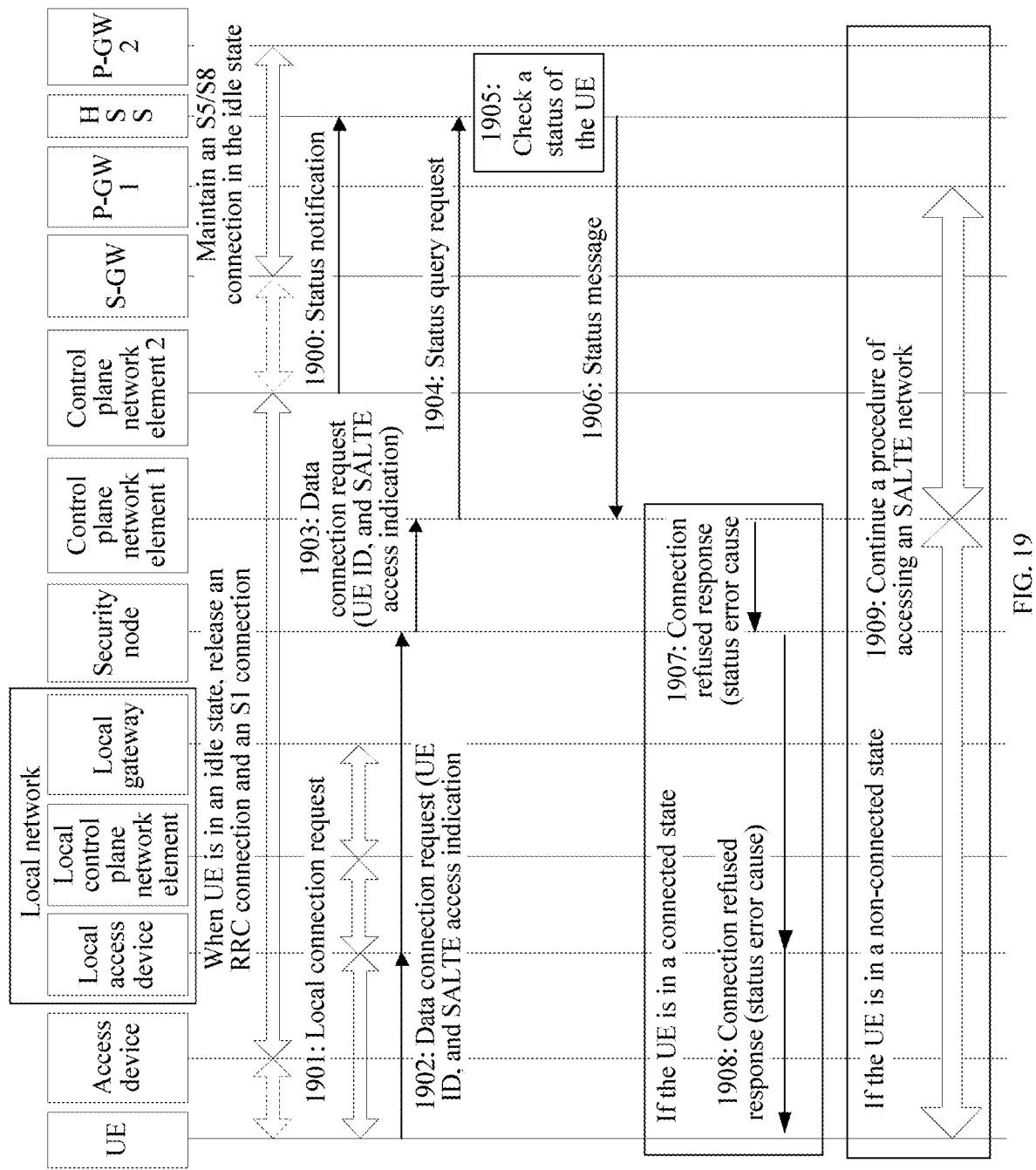
FIG. 19 is a thirteenth flowchart of an example of a network access control method according to an embodiment of this application.

In the architecture of the combined network shown in FIG. 3, referring to FIG. 19, a specific procedure of an example of the network access control method includes the following operations.

Operation 1900: When a status of UE in the LTE network changes, the control plane network element 2 in the LTE network sends a status notification to the HSS, to notify the HSS of the status of the UE in the LTE network.

Operation 1901: The UE sends a local connection request to the local access device, the local control plane network element, and the local gateway in the local network.

Operation 1902: The UE sends a data connection request to the security node according to the IKEv2 protocol by using the local access device, where the data connection request carries an SALTE access indication and a UE ID.

The SALTE access indication is used to indicate that the UE already accesses the LTE network, and now a DC mode is started to access the SALTE network.

In one embodiment, the UE ID may be a GUTI.

Operation 1903: The security node sends the data connection request to the control plane network element 1 in the SALTE network.

Operation 1904: After receiving the data connection request, the control plane network element 1 sends a status query request to the HSS according to the SALTE access indication. The status query request is used to instruct the HSS to check a status of the UE in the LTE network.

In one embodiment, the status query request includes the UE ID.

Operation 1905: The HSS checks a status of the UE, to determine the status of the UE in the LTE network.

Operation 1906: The HSS sends a status message to the control plane network element 1. The status message is used to notify the control plane network element 1 of the status of the UE in the LTE network.

Subsequent operation 1907 to operation 1909 are the same as operation 1509 to operation 1511 in Example 15. Details are not described herein again.

Example 14

Figure 20:
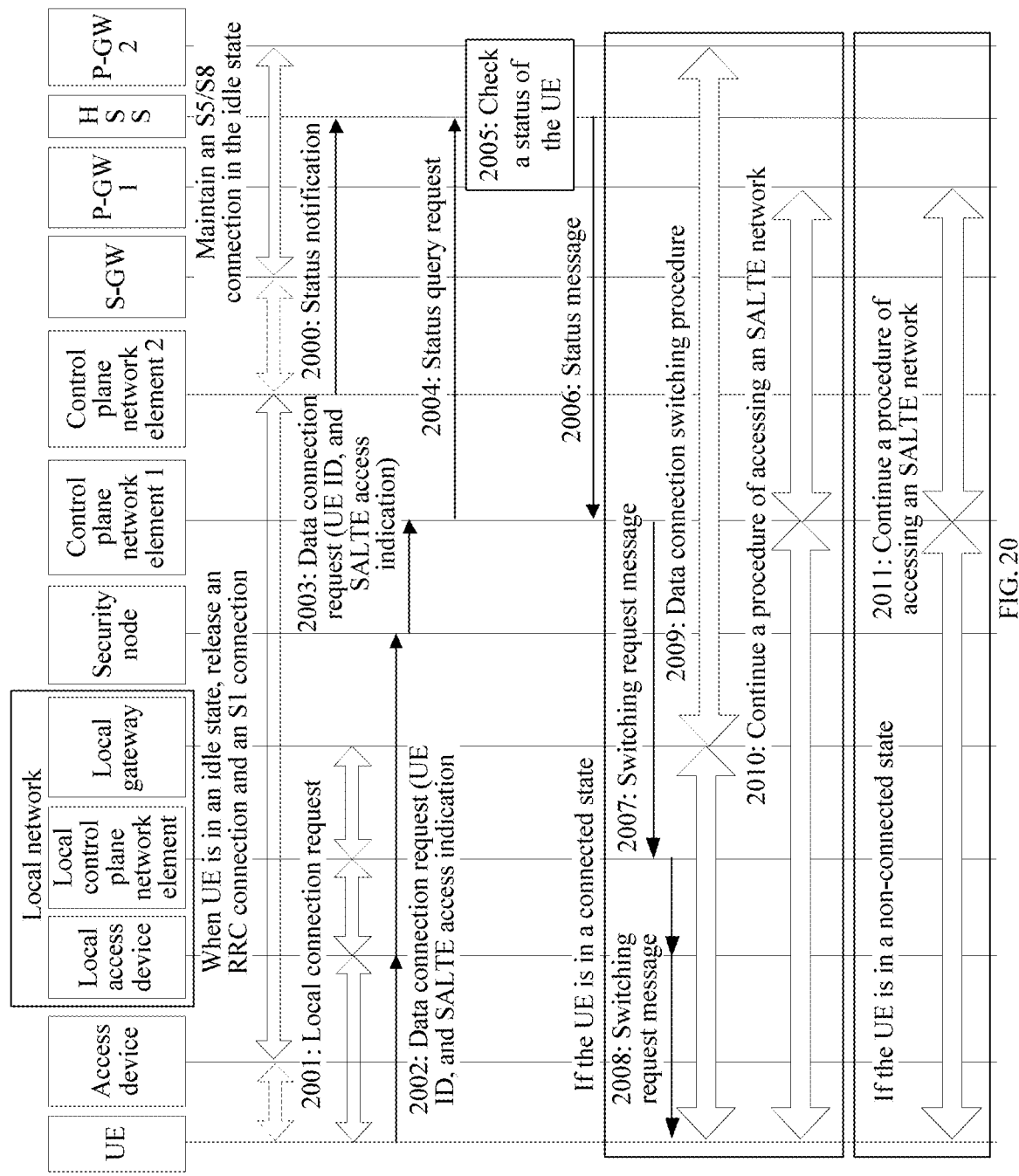
FIG. 20 is a fourteenth flowchart of an example of a network access control method according to an embodiment of this application.

In the architecture of the combined network shown in FIG. 3, referring to FIG. 20, a specific procedure of an example of the network access control method includes the following operations.

Operation 2000 to operation 2006 are the same as operation 1900 to operation 1906 in Example 13. Details are not described herein again.

Operation 2007 to operation 2011 are the same as operation 1609 to operation 1613 in Example 10. Details are not described herein again.

Example 15

Figure 21:
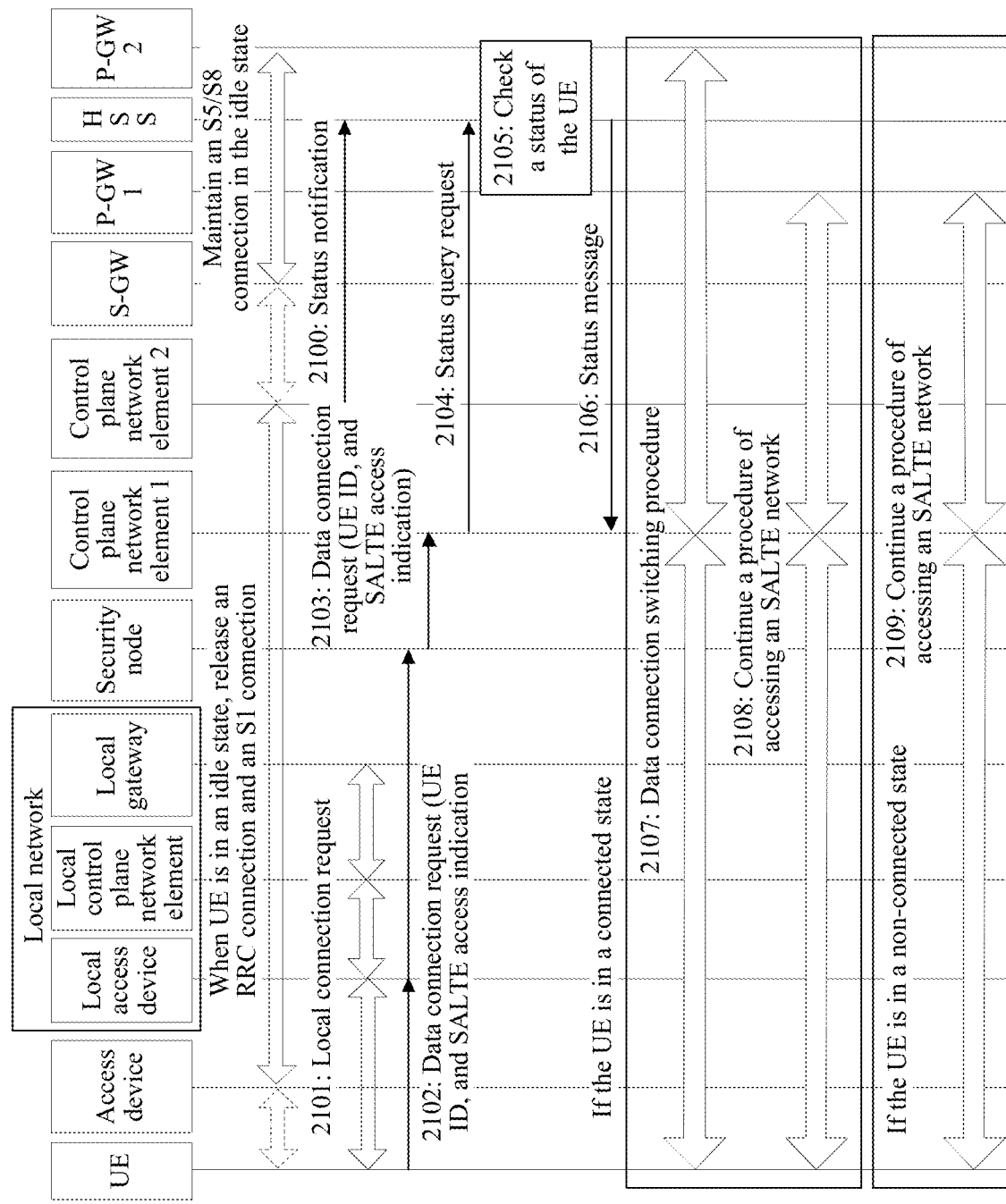
FIG. 21 is a fifteenth flowchart of an example of a network access control method according to an embodiment of this application.

In the architecture of the combined network shown in FIG. 3, referring to FIG. 21, a specific procedure of an example of the network access control method includes the following operations.

Operation 2100 to operation 2106 are the same as operation 1900 to 1906 in Example 13. Details are not described herein again.

Operation 2107 to operation 2109 are the same as operation 1709 to 1711 in Example 11. Details are not described herein again.

Example 16

Figure 22:
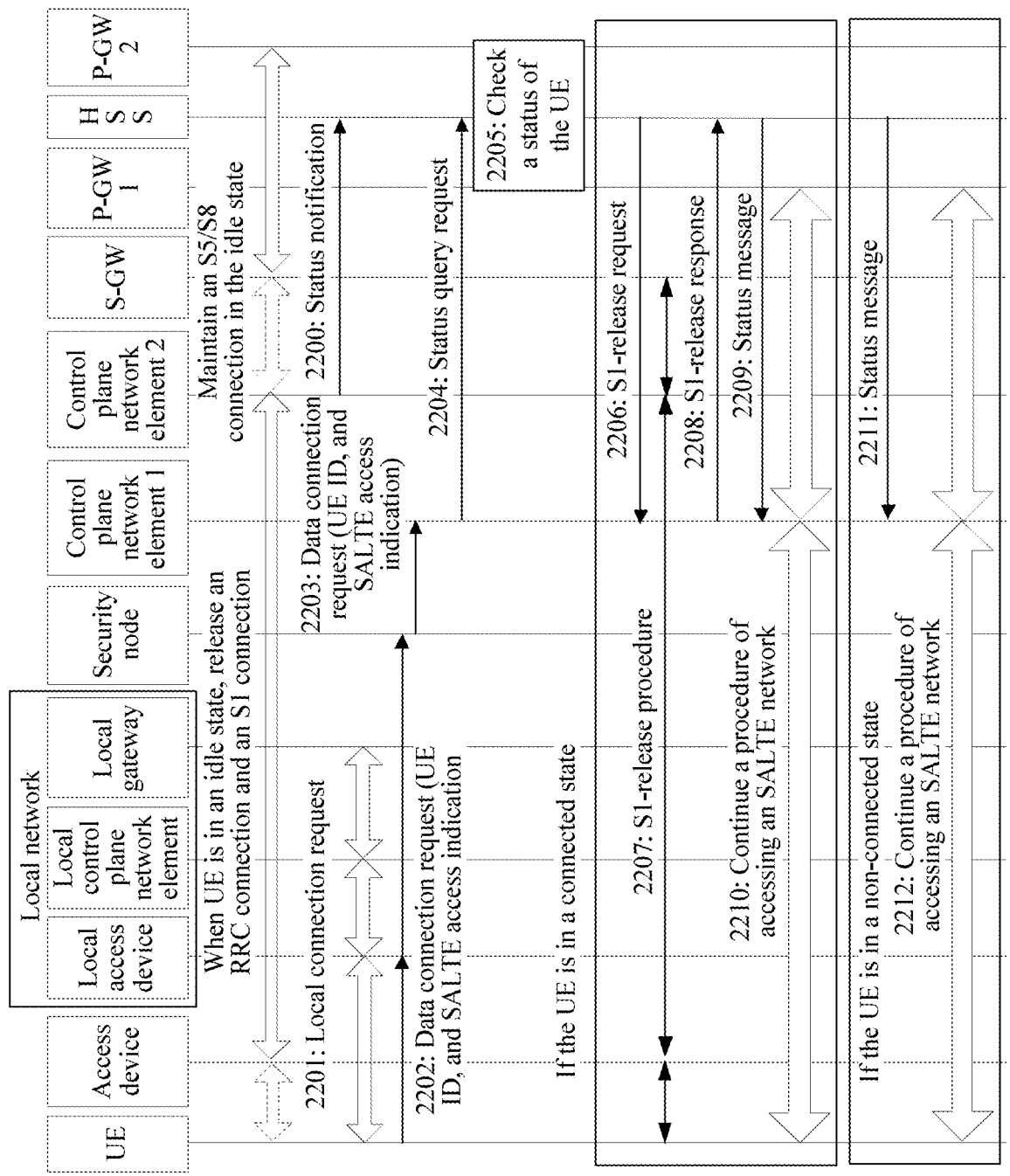
FIG. 22 is a sixteenth flowchart of an example of a network access control method according to an embodiment of this application.

In the architecture of the combined network shown in FIG. 3, referring to FIG. 22, a specific procedure of an example of the network access control method includes the following operations.

Operation 2200 to operation 2205 are the same as operation 1900 to operation 1905 in Example 13. Details are not described herein again.

Operations performed when the UE is in a connected state include:

Operation 2206: When determining that the UE is in the connected state in the LTE network, the HSS sends an S1-release request to the control plane network element 2, to request the control plane network element 2 to initiate an S1-release procedure.

Operation 2207: The control plane network element 2 initiates the S1-release procedure, so that the status of the UE in the LTE network changes to a non-connected state.

Operation 2208: After determining that the S1-release procedure ends, the control plane network element 2 returns an S1-release response to the HSS, to notify the HSS that the S1-release procedure is completed.

Operation 2209: The HSS sends a status message to the control plane network element 1, to notify the control plane network element 1 that the UE is in the non-connected state in the LTE network.

Operation 2210: The control plane network element 1 continues a procedure of accessing the SALTE network.

Operations performed when the UE is in the non-connected state include:

Operation 2211: The HSS sends a status message to the control plane network element 1, to notify the control plane network element 1 that the UE is in the non-connected state in the LTE network.

Operation 2212: The control plane network element 1 continues a procedure of accessing the SALTE network.

In any one of the examples of the network access control method in the embodiments of this application, it can be ensured that the terminal device can have a data connection to only one network, it can be ensured that the terminal device can normally transmit data, network access control can be implemented on the terminal device, and occurrence of a network connection error or a runtime error of the terminal device when the terminal device has a data connection to one network and forcibly establishes a data connection to another network can be avoided.

Figure 23:
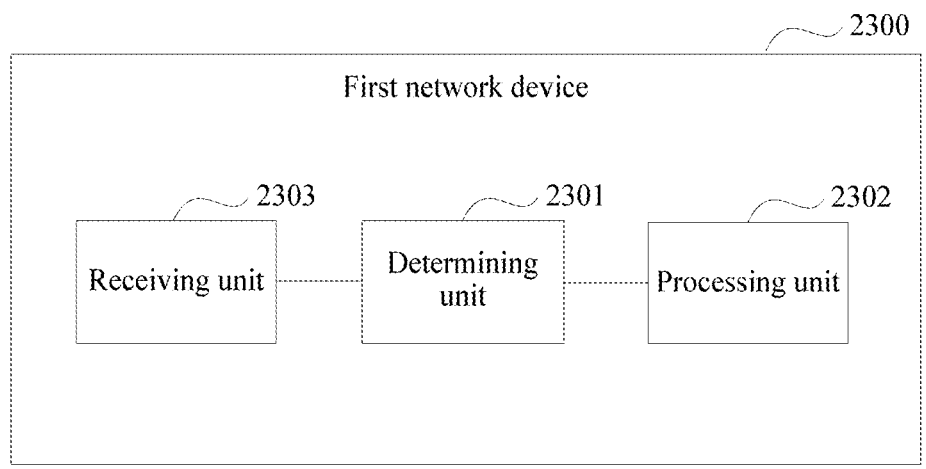
FIG. 23 is a schematic structural diagram of a first network device according to an embodiment of this application.

Based on the foregoing embodiment, this application further provides a first network device. The first network device is applied to any one of the combined networks shown in FIG. 1 to FIG. 3, and is configured to implement the network access control method shown in FIG. 4. Referring to FIG. 23, the first network device 2300 includes a determining unit 2301 and a processing unit 2302.

The determining unit 2301 is configured to determine, after a terminal device requests to establish a first data connection to a first network, that a second data connection exists between the terminal device and a second network.

The processing unit 2302 is configured to perform the following operations:

instructing the terminal device to stop the establishment of the first data connection; or instructing the terminal device to end the second data connection, or after the second data connection is broken, continuing to perform a procedure of establishing the first data connection; or instructing a second network device to end the second data connection, and instructing a third network device to establish the first data connection.

In one embodiment, the first network device 2300 further includes:

a receiving unit 2303, configured to: before the determining unit 2301 determines that the second data connection exists between the terminal device and the second network, receive a data connection request for the first network sent by the terminal device; or receive a status query request sent by a fourth network device.

In one embodiment, when determining that the second data connection exists between the terminal device and the second network, the determining unit 2301 is further configured to:

detect that the second data connection exists between the terminal device and the second network; or receive a status message sent by a fifth network device, and determine, based on the status message, that the second data connection exists between the terminal device and the second network, where the status message is used to indicate that the second data connection exists between the terminal device and the second network.

In one embodiment, when determining that the second data connection exists between the terminal device and the second network, the determining unit 2301 is further configured to:

determine that the terminal device is in a connected state in the second network.

In one embodiment, when instructing the terminal device to stop the establishment of the first data connection, the processing unit 2302 is further configured to:

send an access stop message to the terminal device, where the access stop message is used to instruct the terminal device to stop the establishment of the first data connection.

In one embodiment, the access stop message includes a status error cause, and the status error cause is used to notify that the second data connection exists between the terminal device and the second network.

In one embodiment, when sending the access stop message to the terminal device, the processing unit 2302 is further configured to:

forward the access stop message to the terminal device by using another network device.

In one embodiment, when instructing the terminal device to end the second data connection, the processing unit 2302 is further configured to:

send a first switching request message to the terminal device, where the first switching request message is used to instruct the terminal device to switch a data connection of the terminal device from the second data connection to the first data connection.

In one embodiment, the first switching request message includes a status error cause, and the status error cause is used to notify that the second data connection exists between the terminal device and the second network.

In one embodiment, when sending the first switching request message to the terminal device, the processing unit 2302 is further configured to:

forward the first switching request message to the terminal device by using another network device.

In one embodiment, when breaking the second data connection, the processing unit 2302 is further configured to:

initiate a release procedure of the second data connection; or switch a data connection of the terminal device from the second data connection to the first data connection.

In one embodiment, when instructing the second network device to end the second data connection, the processing unit 2302 is further configured to:

send a second switching request message to the second network device, where the second switching request message is used to instruct the second network device to switch a data connection of the terminal device from the second data connection to the first data connection.

In one embodiment, the second switching request message includes a status error cause, and the status error cause is used to notify the second network device that the second data connection exists between the terminal device and the second network.

In one embodiment, the determining unit 2301 is further configured to determine that no data connection exists between the terminal device and the second network; and the processing unit 2302 is further configured to perform the procedure of establishing the first data connection.

In one embodiment, when determining that no data connection exists between the terminal device and the second network, the determining unit 2301 is further configured to:

determine that the terminal device is in an idle state in the second network.

In one embodiment, the first network device 2300 includes a control plane network element or an HSS.

According to the first network device provided in this embodiment of this application, if the terminal device already establishes the second data connection to the second network, the first network device controls the terminal device to stop the establishment of the first data connection to the first network, or controls the terminal device to end the second data connection to the second network, to smoothly establish the first data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

Figure 24:
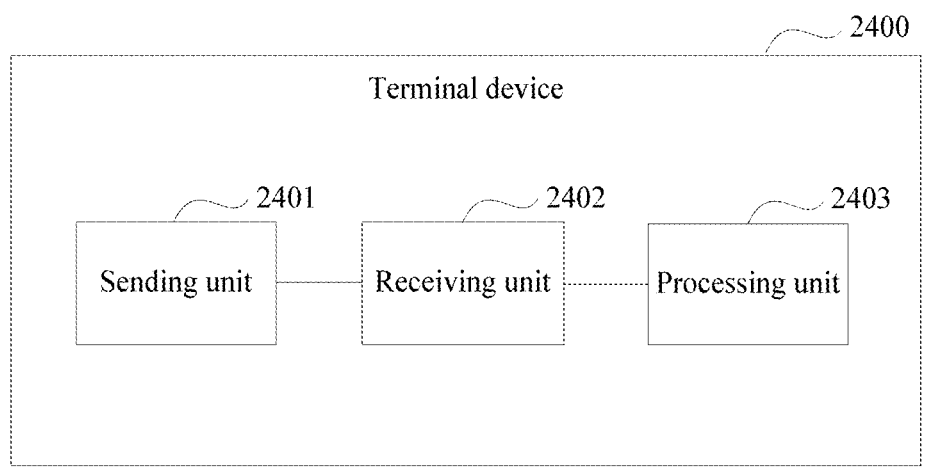
FIG. 24 is a schematic structural diagram of a terminal device according to an embodiment of this application.

Based on the foregoing embodiment, this application further provides a terminal device. The terminal device is applied to any one of the combined networks shown in FIG. 1 to FIG. 3, and is configured to implement the network access control method shown in FIG. 5. Referring to FIG. 24, the terminal device 2400 includes a sending unit 2401, a receiving unit 2402, and a processing unit 2403.

The sending unit 2401 is configured to request to establish a first data connection to a first network.

The receiving unit 2402 is configured to receive an access stop message sent by a first network device, where the access stop message is used to instruct the terminal device to stop the establishment of the first data connection.

The processing unit 2403 is configured to stop a procedure of establishing the first data connection.

In one embodiment, the access message includes a status error cause, and the status error cause is used to notify that the second data connection exists between the terminal device 2400 and the second network.

In one embodiment, when receiving the access stop message sent by the first network device, the receiving unit 2402 is further configured to:

receive, by using another network device, the access stop message sent by the first network device.

In one embodiment, when requesting to establish the first data connection to the first network, the sending unit 2401 is further configured to:

send a data connection request for the first network to the first network device; or send a data connection request for the first network to the another network device.

According to the terminal device provided in this embodiment of this application, after the terminal device requests to establish the first data connection to the first network, the terminal device receives the access stop message sent by the first network device, and stops the procedure of establishing the first data connection, to avoid occurrence of a network connection error or a runtime error of the terminal device when a data connection is forcibly established to the first network.

Figure 25:
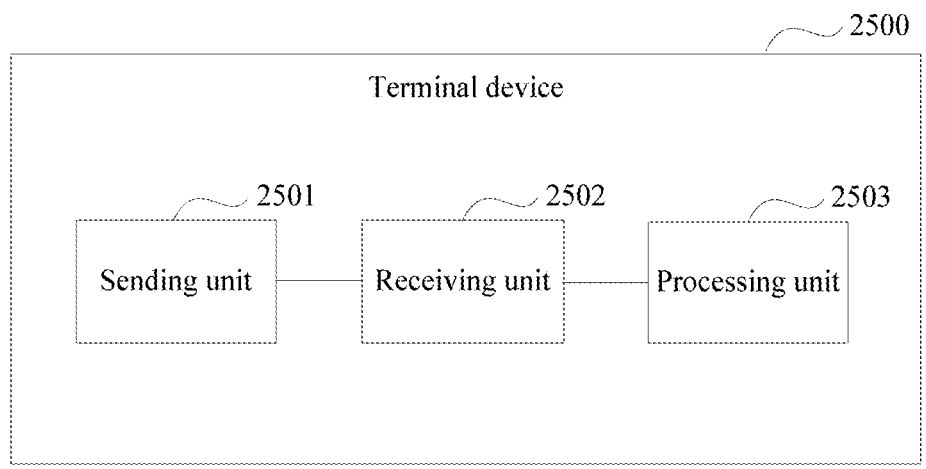
FIG. 25 is a schematic structural diagram of another terminal device according to an embodiment of this application.

Based on the foregoing embodiment, this application further provides a terminal device. The terminal device is applied to any one of the combined networks shown in FIG. 1 to FIG. 3, and is configured to implement the network access control method shown in FIG. 6. Referring to FIG. 25, the terminal device 2500 includes a sending unit 2501, a receiving unit 2502, and a processing unit 2503.

The sending unit 2501 is configured to request to establish a first data connection to a first network.

The receiving unit 2502 is configured to receive a first switching request message sent by a first network device, where the first switching request message is used to instruct the terminal device to switch a data connection of the terminal device from a second data connection to the first data connection, and the second data connection is a data connection existing between the terminal device and a second network.

The processing unit 2503 is configured to switch the data connection of the terminal device from the second data connection to the first data connection.

In one embodiment, the first switching request message includes a status error cause, and the status error cause is used to notify that the second data connection exists between the terminal device 2500 and the second network.

In one embodiment, when receiving the first switching request message sent by the first network device, the receiving unit 2502 is further configured to:

receive, by using another network device, the first switching request message sent by the first network device.

In one embodiment, when requesting to establish the first data connection to the first network, the sending unit 2501 is further configured to:

send a data connection request for the first network to the first network device; or send a data connection request for the first network to the another network device.

According to the terminal device provided in this embodiment of this application, after the terminal device requests to establish the first data connection to the first network, the terminal device receives a first switching access message sent by the first network device, and switches the data connection of the terminal device from the second data connection to the first data connection, to avoid occurrence of a network connection error or a runtime error of the terminal device when a data connection is forcibly established to the first network if the second data connection is not broken.

It should be noted that, the unit division in the embodiments of this application is an example and is merely logical function division. During actual implementation, there may be another division manner. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 26:
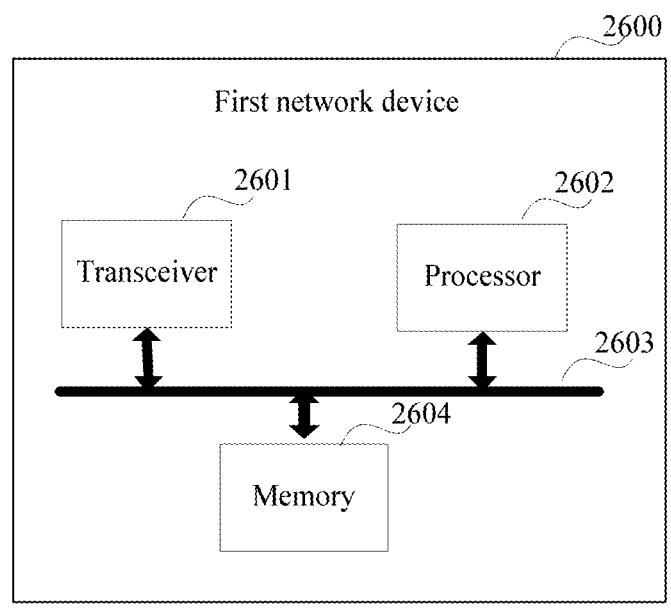
FIG. 26 is a structural diagram of a first network device according to an embodiment of this application.

Based on the foregoing embodiment, an embodiment of this application further provides a first network device. The first network device is applied to any one of the combined networks shown in FIG. 1 to FIG. 3, and is configured to implement the network access control method shown in FIG. 4. The first network device includes a control plane network element or an HSS. Referring to FIG. 26, the first network device 2600 includes a transceiver 2601, a processor 2602, a bus 2603, and a memory 2604.

The transceiver 2601, the processor 2602, and the memory 2604 are connected to each other by using the bus 2603. The bus 2603 may be a peripheral component interconnect (PCI) bus or an extended industry standard architecture (EISA) bus, or the like. The bus may be classified into an address bus, a data bus, a control bus, and the like. For ease of representation, only one thick line is used to represent the bus in FIG. 26, but this does not mean that there is only one bus or only one type of bus.

The transceiver 2601 is configured to communicate and interact with another device that is in the combined network and that is connected to the first network device.

The processor 2602 is configured to implement the network access control method shown in FIG. 4, including:

determining, after a terminal device requests to establish a first data connection to a first network, that a second data connection exists between the terminal device and a second network; and performing the following operation:

instructing the terminal device to stop the establishment of the first data connection; or instructing the terminal device to end the second data connection, or after the second data connection is broken, continuing to perform a procedure of establishing the first data connection; or instructing a second network device to end the second data connection, and instructing a third network device to establish the first data connection.

In one embodiment, the processor 2602 is further configured to:

before determining that the second data connection exists between the terminal device and the second network, receive a data connection request for the first network sent by the terminal device; or receive a status query request sent by a fourth network device.

In one embodiment, when determining that the second data connection exists between the terminal device and the second network, the processor 2602 is further configured to:

detect that the second data connection exists between the terminal device and the second network; or receive a status message sent by a fifth network device, and determine, based on the status message, that the second data connection exists between the terminal device and the second network, where the status message is used to indicate that the second data connection exists between the terminal device and the second network.

In one embodiment, when determining that the second data connection exists between the terminal device and the second network, the processor 2602 is further configured to:

determine that the terminal device is in a connected state in the second network.

In one embodiment, when instructing the terminal device to stop the establishment of the first data connection, the processor 2602 is further configured to:

send an access stop message to the terminal device, where the access stop message is used to instruct the terminal device to stop the establishment of the first data connection.

In one embodiment, the access stop message includes a status error cause, and the status error cause is used to notify that the second data connection exists between the terminal device and the second network.

In one embodiment, when sending the access stop message to the terminal device, the processor 2602 is further configured to:

forward the access stop message to the terminal device by using another network device.

In one embodiment, when instructing the terminal device to end the second data connection, the processor 2602 is further configured to:

send a first switching request message to the terminal device, where the first switching request message is used to instruct the terminal device to switch a data connection of the terminal device from the second data connection to the first data connection.

In one embodiment, the first switching request message includes a status error cause, and the status error cause is used to notify that the second data connection exists between the terminal device and the second network.

In one embodiment, when sending the first switching request message to the terminal device, the processor 2602 is further configured to:

forward the first switching request message to the terminal device by using another network device.

In one embodiment, when breaking the second data connection, the processor 2602 is further configured to:

initiate a release procedure of the second data connection; or switch a data connection of the terminal device from the second data connection to the first data connection.

In one embodiment, when instructing the second network device to end the second data connection, the processor 2602 is further configured to:

send a second switching request message to the second network device, where the second switching request message is used to instruct the second network device to switch a data connection of the terminal device from the second data connection to the first data connection.

In one embodiment, the second switching request message includes a status error cause, and the status error cause is used to notify the second network device that the second data connection exists between the terminal device and the second network.

In one embodiment, the processor 2602 is further configured to determine that no data connection exists between the terminal device and the second network; and perform the procedure of establishing the first data connection.

In one embodiment, when determining that no data connection exists between the terminal device and the second network, the processor 2602 is further configured to:

determine that the terminal device is in an idle state in the second network.

The memory 2604 is configured to store a program and the like. Further, the program may include program code. The program code includes a computer operation instruction. The memory 2604 may include a random access memory (RAM), and may also include a non-volatile memory, for example, at least one magnetic disk memory. The processor 2602 executes an application program stored in the memory 2604 to implement the foregoing function, thereby implementing the network access control method shown in FIG. 4.

According to the first network device provided in this embodiment of this application, if the terminal device already establishes the second data connection to the second network, the first network device controls the terminal device to stop the establishment of the first data connection to the first network, or controls the terminal device to end the second data connection to the second network, to smoothly establish the first data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

Figure 27:
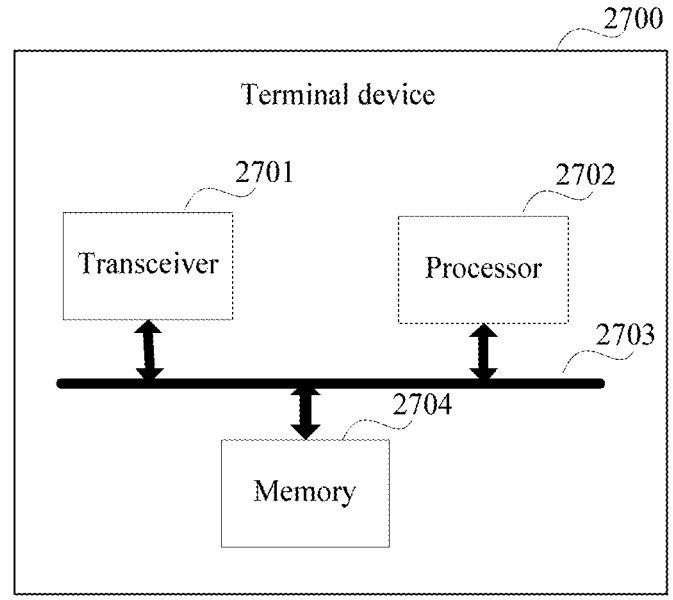
FIG. 27 is a structural diagram of a terminal device according to an embodiment of this application.

Based on the foregoing embodiment, this application further provides a terminal device. The terminal device is applied to any one of the combined networks shown in FIG. 1 to FIG. 3, and is configured to implement the network access control method shown in FIG. 5. Referring to FIG. 27, the terminal device 2700 includes a transceiver 2701, a processor 2702, a bus 2703, and a memory 2704.

The transceiver 2701, the processor 2702, and the memory 2704 are connected to each other by using the bus 2703. The bus 2703 may be a PCI bus, an EISA bus, or the like. The bus may be classified into an address bus, a data bus, a control bus, and the like. For ease of representation, only one thick line is used to represent the bus in FIG. 27, but this does not mean that there is only one bus or only one type of bus.

The transceiver 2701 is configured to communicate and interact with another device that is in the combined network and that is connected to the terminal device.

The processor 2702 is configured to implement the network access control method shown in FIG. 5, including:
requesting to establish a first data connection to a first network;
receiving an access stop message sent by a first network device, where the access stop message is used to instruct the terminal device to stop the establishment of the first data connection; and
stopping a procedure of establishing the first data connection.

In one embodiment, the access message includes a status error cause, and the status error cause is used to notify that the second data connection exists between the terminal device 2700 and the second network.

In one embodiment, when receiving the access stop message sent by the first network device, the processor 2702 is further configured to:
receive, by using another network device, the access stop message sent by the first network device.

In one embodiment, when requesting to establish the first data connection to the first network, the processor 2702 is further configured to:
send a data connection request for the first network to the first network device; or
send a data connection request for the first network to the another network device.

The memory 2704 is configured to store a program and the like. Further, the program may include program code. The program code includes a computer operation instruction. The memory 2704 may include a random access memory (RAM), and may also include a non-volatile memory, for example, at least one magnetic disk memory. The processor 2702 executes an application program stored in the memory 2704 to implement the foregoing function, thereby implementing the network access control method shown in FIG. 5.

According to the terminal device provided in this embodiment of this application, after the terminal device requests to establish the first data connection to the first network, the terminal device receives the access stop message sent by the first network device, and stops the procedure of establishing the first data connection, to avoid occurrence of a network connection error or a runtime error of the terminal device when a data connection is forcibly established to the first network.

Figure 28:
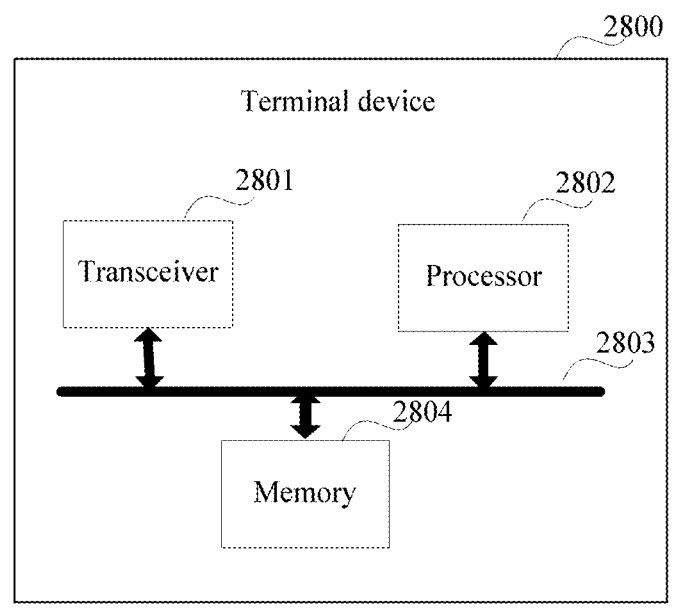
FIG. 28 is a structural diagram of another terminal device according to an embodiment of this application.

Based on the foregoing embodiment, this application further provides a terminal device. The terminal device is applied to any one of the combined networks shown in FIG. 1 to FIG. 3, and is configured to implement the network access control method shown in FIG. 6. Referring to FIG. 28, the terminal device 2800 includes a transceiver 2801, a processor 2802, a bus 2803, and a memory 2804.

The transceiver 2801, the processor 2802, and the memory 2804 are connected to each other by using the bus 2803. The bus 2803 may be a PCI bus, an EISA bus, or the like. The bus may be classified into an address bus, a data bus, a control bus, and the like. For ease of representation, only one thick line is used to represent the bus in FIG. 28, but this does not mean that there is only one bus or only one type of bus.

The transceiver 2801 is configured to communicate and interact with another device that is in the combined network and that is connected to the first network device.

The processor 2802 is configured to implement the network access control method shown in FIG. 6, including:
requesting to establish a first data connection to a first network;
receiving a first switching request message sent by a first network device, where the first switching request message is used to instruct the terminal device to switch a data connection of the terminal device from a second data connection to the first data connection, and the second data connection is a data connection existing between the terminal device and a second network; and
switching the data connection of the terminal device from the second data connection to the first data connection.

In one embodiment, the first switching request message includes a status error cause, and the status error cause is used to notify that the second data connection exists between the terminal device 2800 and the second network.

In one embodiment, when receiving the first switching request message sent by the first network device, the processor 2802 is further configured to:
receive, by using another network device, the first switching request message sent by the first network device.

In one embodiment, when requesting to establish the first data connection to the first network, the processor 2802 is further configured to:
send a data connection request for the first network to the first network device; or
send a data connection request for the first network to the another network device.

The memory 2804 is configured to store a program and the like. Further, the program may include program code. The program code includes a computer operation instruction. The memory 2804 may include a RAM, and may also include a non-volatile memory, for example, at least one magnetic disk memory. The processor 2802 executes an application program stored in the memory 2804 to implement the foregoing function, thereby implementing the network access control method shown in FIG. 6.

According to the terminal device provided in this embodiment of this application, after the terminal device requests to establish the first data connection to the first network, the terminal device receives a first switching access message sent by the first network device, and switches the data connection of the terminal device from the second data connection to the first data connection, to avoid occurrence of a network connection error or a runtime error of the terminal device when a data connection is forcibly established to the first network if the second data connection is not broken.

The embodiments of this application provide the network access control method and the apparatus. In the method, after the terminal device requests to establish the first data connection to the first network, the first network device determines that the second data connection exists between the terminal device and the second network. In this case, the first network device may instruct the terminal device to stop the establishment of the first data connection, or instruct the terminal device to end the second data connection and continue to perform the procedure of establishing the first data connection, or the first network device directly ends the second data connection and continues to perform a procedure of establishing the first data connection, or the first network device instructs the second network device to end the second data connection and instructs the third network device to establish the first data connection. In conclusion, if the terminal device already establishes the data connection to the second network, the first network device controls the terminal device to stop the establishment of the data connection to the first network, or control the terminal device to break the data connection to the second network, to smoothly establish the data connection to the first network, thereby ensuring that the terminal device can have a data connection to only one network, ensuring that the terminal device can normally transmit data, implementing network access control on the terminal device, and avoiding occurrence of a network connection error or a runtime error of the terminal device when the terminal device has a data connection to one network and forcibly establishes a data connection to another network.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including, but not limited to, a magnetic disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Although some preferred embodiments of this application have been described, persons skilled in the art can make changes and modifications to these embodiments once they learn of the basic inventive concept. Therefore, the following claims are intended to be construed as to cover the embodiments and all changes and modifications falling within the scope of this application.

Obviously, persons skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A network access control method, comprising:
   determining, by a first network device after a terminal device requests to establish a first data connection to a first network, that a second data connection exists between the terminal device and a second network; and
   performing, by the first network device, one of the following operations:
   instructing, by the first network device, the terminal device to stop the establishment of the first data connection by sending an access stop message to the terminal device, wherein the access stop message is used to instruct the terminal device to stop the establishment of the first data connection;
   instructing, by the first network device, the terminal device to end the second data connection, or after the first network device ends the second data connection, continuing, by the first network device, to perform a procedure of establishing the first data connection; or
   instructing, by the first network device, a second network device to end the second data connection, and instructing a third network device to establish the first data connection.

2. The method according to claim 1, wherein before the determining, by a first network device, that a second data connection exists between the terminal device and the second network, the method further comprising:

receiving, by the first network device, a data connection request for the first network sent by the terminal device; or receiving, by the first network device, a status query request sent by a fourth network device.

3. The method according to claim 1, wherein the determining, by a first network device, that the second data connection exists between the terminal device and the second network comprises:

determining, by the first network device, that the terminal device is in a connected state in the second network.

4. The method according to claim 1,
wherein the access stop message comprises a status error cause, and the status error cause is used to notify that the second data connection exists between the terminal device and the second network.

5. The method according to claim 1, wherein the instructing, by the first network device, the terminal device to end the second data connection comprises:

sending, by the first network device, a first switching request message to the terminal device, wherein the first switching request message is used to instruct the terminal device to switch a data connection of the terminal device from the second data connection to the first data connection.

6. The method according to claim 1, wherein the ending, by the first network device, the second data connection comprises:

initiating, by the first network device, a release procedure of the second data connection; or switching, by the first network device, a data connection of the terminal device from the second data connection to the first data connection.

7. The method according to claim 1, further comprising:

determining, by the first network device, that no data connection exists between the terminal device and the second network; and performing, by the first network device, the procedure of establishing the first data connection.

8. The method according to claim 7, wherein the determining, by the first network device, that no data connection exists between the terminal device and the second network comprises:

determining, by the first network device, that the terminal device is in an idle state in the second network.

9. A first network device comprising:

at least one processor and a memory storing computer instructions, wherein the computer instructions are executed by the at least one processor to cause the first network device to:

determine that a second data connection exists between a terminal device and a second network after the terminal device requests to establish a first data connection to a first network; and perform one of the following operations:

instruct the terminal device to stop the establishment of the first data connection by sending an access stop message to the terminal device, wherein the access stop message is used to instruct the terminal device to stop the establishment of the first data connection;

instruct the terminal device to end the second data connection, or after the second data connection is broken, continuing to perform a procedure of establishing the first data connection; or instruct a second network device to end the second data connection, and instruct a third network device to establish the first data connection.

10. The first network device according to claim 9, wherein the computer instructions further cause the first network device to: before determining that the second data connection exists between the terminal device and the second network, receive a data connection request for the first network sent by the terminal device; or receive a status query request sent by a fourth network device.

11. The first network device according to claim 9, wherein to determine that the second data connection exists between the terminal device and the second network, comprises:

determine that the terminal device is in a connected state in the second network.

12. The first network device according to claim 9, wherein the access stop message comprises a status error cause, and the status error cause is used to notify that the second data connection exists between the terminal device and the second network.

13. The first network device according to claim 9, wherein to instruct the terminal device to end the second data connection, comprises:

send a first switching request message to the terminal device, wherein the first switching request message is used to instruct the terminal device to switch a data connection of the terminal device from the second data connection to the first data connection.

14. The first network device according to claim 9, wherein to end the second data connection, comprises:

initiate a release procedure of the second data connection; or switch a data connection of the terminal device from the second data connection to the first data connection.

15. The first network device according to claim 9, wherein the computer instructions further cause the first network device to:

determine that no data connection exists between the terminal device and the second network; and the at least one processor is further configured to perform a procedure of establishing the first data connection.

16. The first network device according to claim 15 wherein to determine that no data connection exists between the terminal device and the second network, comprises:

determine that the terminal device is in an idle state in the second network.

* * * * *